United States Patent [19]

Bobick

[11] Patent Number: 4,568,983
[45] Date of Patent: Feb. 4, 1986

[54] IMAGE DATA COMPRESSION/DECOMPRESSION

[75] Inventor: Thomas W. Bobick, Richardson, Tex.
[73] Assignee: The Mead Corporation, Dayton, Ohio
[21] Appl. No.: 559,142
[22] Filed: Dec. 7, 1983
[51] Int. Cl.⁴ ............................................. H04N 1/415
[52] U.S. Cl. .................................. 358/260; 358/261; 358/263
[58] Field of Search ................. 358/260, 261, 263; 340/347 DD

[56] References Cited

U.S. PATENT DOCUMENTS

| | | | |
|---|---|---|---|
| 2,953,638 | 9/1960 | Wintringham | 358/260 |
| 3,916,095 | 10/1975 | Weber et al. | 358/261 |
| 3,992,572 | 11/1976 | Nakagome et al. | 358/260 |
| 4,048,656 | 9/1977 | Ishii et al. | 358/261 |
| 4,070,694 | 1/1978 | Sakamoto et al. | 358/260 |
| 4,121,259 | 10/1978 | Preuss et al. | 358/261 |
| 4,135,214 | 1/1979 | Weber | 358/261 |
| 4,327,379 | 4/1982 | Kadakia et al. | 358/261 |
| 4,376,933 | 3/1983 | Saran et al. | 358/261 |
| 4,386,373 | 5/1983 | Kondo et al. | 358/260 |
| 4,499,499 | 2/1985 | Brickman et al. | 358/260 |

Primary Examiner—James J. Groody
Assistant Examiner—John K. Peng
Attorney, Agent, or Firm—Biebel, French & Nauman

[57] ABSTRACT

Scanned image data is assembled to represent scanned strips of a document each strip comprising a plurality of scanned lines. The lines of each strip are read in parallel to form data words defining columns of the scanned strips. The data words are encoded by means of Huffman and run-length coding to generate fixed-length coded words which are concatenated to represent the document. Each strip of coded words is reviewed and uncoded data is substituted for coded data in the event the coded data exceeds the uncoded data. Text data and continuous tone data are encoded using different encoding techniques due to their varying characteristics. Synchronization words are used to prefix all coded data strips; to prefix and suffix all uncoded data strips; to define all white and all black strips; and, to indicate changes in data type, i.e., text to continuous tone or vice versa. At least the first and the last data word of each encoded strip are defined as text so that decoding can commence using text decoding techniques. The utilization of fixed-length coded words, the forced definition of at least the first and last data word of each strip as text, and the synchronization code words permit bidirectional decoding of encoded data blocks.

16 Claims, 46 Drawing Figures

| GROUP NO. | BITS REQUIRED | | |
|---|---|---|---|
| | GROUP | DATA | TOTAL |
| 0 | 1 | 1 | 2 |
| 1 | 2 | 2 | 4 |
| | 3 | 1 | 4 |
| 2 | 3 | 4 | 7 |

FIG. 2A

TEXT CODES

Output Group 000

| C C | R R R R | |
|---|---|---|

| C C | DATA | RUN |
|---|---|---|
| 0 0 | 0<br>0<br>0<br>0 | R R R R |
| 0 1 | 1<br>1<br>1<br>1 | R R R R |

Output Group 001

| C C | R R R R | C' C' | R' R' R' R' |
|---|---|---|---|

| C C C' C' | DATA | RUN |
|---|---|---|
| 0 0 0 0 | 0<br>0<br>0<br>0 | R R R R R' R' R' R' |
| 0 1 0 1 | 1<br>1<br>1<br>1 | R R R R R' R' R' R' |

FIG. 2B

TEXT CODES (CONT.)

Output Group 010

| 1 0 | C C R R | |
|---|---|---|

| C C | DATA | RUN |
|---|---|---|
| 0 0 | 0<br>0<br>0<br>1 | R R |
| 0 1 | 0<br>0<br>1<br>1 | R R |
| 1 0 | 0<br>1<br>1<br>1 | R R |
| 1 1 | 1<br>1<br>1<br>0 | R R |

Output Group 010

| 1 1 0 | C R R | |
|---|---|---|

| C | DATA | RUN |
|---|---|---|
| 0 | 1<br>1<br>0<br>0 | R R |
| 1 | 1<br>0<br>0<br>0 | R R |

FIG. 2C

TEXT CODES (CONT.)

Output Group 011

| 1 1 1 | C C C C | R R R R R |
|---|---|---|

| C C C C | DATA | RUN |
|---|---|---|
| 0 0 0 0 | 0<br>0<br>0<br>1 | R R R R R |
| 0 0 0 1 | 0<br>0<br>1<br>1 | R R R R R |
| 0 0 1 0 | 0<br>1<br>1<br>1 | R R R R R |
| 0 0 1 1 | 1<br>1<br>1<br>0 | R R R R R |
| 0 1 0 0 | 1<br>1<br>0<br>0 | R R R R R |
| 0 1 0 1 | 1<br>0<br>0<br>0 | R R R R R |
| 0 1 1 0 | 0<br>0<br>0<br>0 | R R R R R |
| 0 1 1 1 | 1<br>1<br>1<br>1 | R R R R R |

FIG. 2D

TEXT CODES (CONT.)

Output Group 011

| 1 1 1 | C C C C | R R R R R |

| C C C C | DATA | RUN |
|---------|------|-----|
| 1 0 0 0 | 0<br>0<br>1<br>0 | R R R R R |
| 1 0 0 1 | 0<br>1<br>1<br>0 | R R R R R |
| 1 0 1 0 | 0<br>1<br>0<br>0 | R R R R R |
| 1 0 1 1 | 0<br>1<br>0<br>1 | R R R R R |
| 1 1 0 0 | 1<br>0<br>1<br>0 | R R R R R |
| 1 1 0 1 | 1<br>0<br>1<br>1 | R R R R R |
| 1 1 1 0 | 1<br>0<br>0<br>1 | R R R R R |
| 1 1 1 1 | 1<br>1<br>0<br>1 | R R R R R |

FIG. 2E

TEXT CODES (CONT.)

Output Group 100

| | 1 1 1 C C C |
|---|---|

| C C C | DATA | RUN |
|---|---|---|
| 0 0 0 | 0 0 1 0 | SINGLE BYTE |
| 0 0 1 | 0 1 1 0 | SINGLE BYTE |
| 0 1 0 | 0 1 0 0 | SINGLE BYTE |
| 0 1 1 | 0 1 0 1 | SINGLE BYTE |
| 1 0 0 | 1 0 1 0 | SINGLE BYTE |
| 1 0 1 | 1 0 1 1 | SINGLE BYTE |
| 1 1 0 | 1 0 0 1 | SINGLE BYTE |
| 1 1 1 | 1 1 0 1 | SINGLE BYTE |

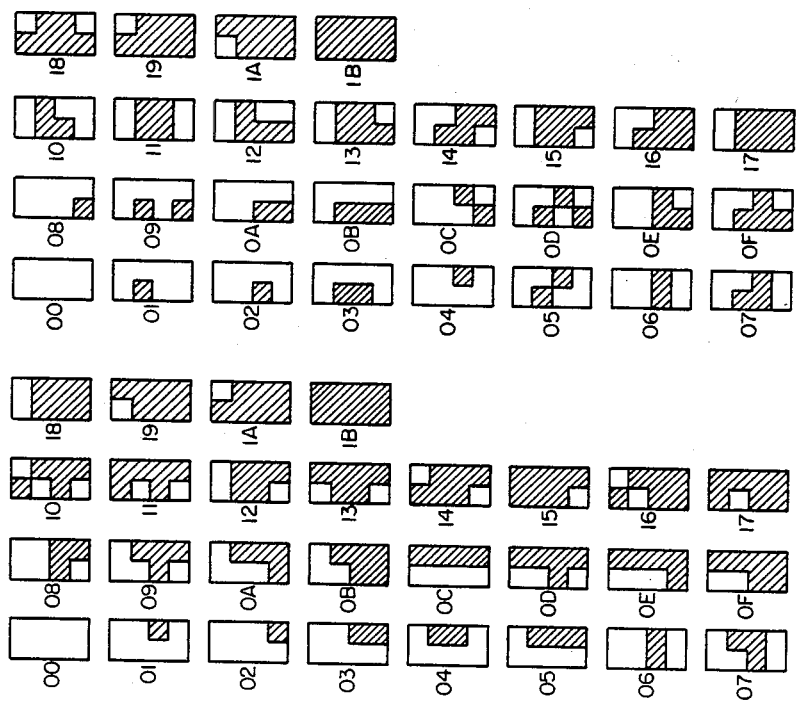
FIG. 7
FIG. 6
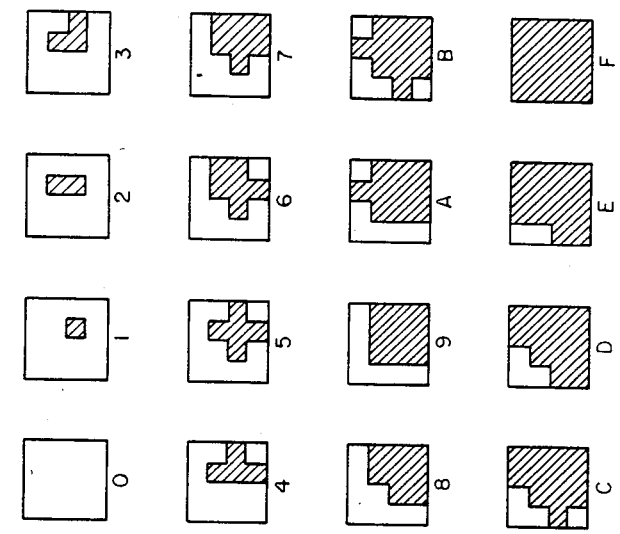
FIG. 5

FIG. 9

SYNC CODES

| 0 0 0 0 0 0 0 0 | c c c c |
|---|---|

| c c c c | |
|---|---|
| 0 0 0 0 | |
| 0 0 0 1 | |
| 0 0 1 0 | |
| 0 0 1 1 | TEXT/C.T. SWITCH |
| 0 1 0 0 | NORMAL COMPRESSED STRIP |
| 0 1 0 1 | |
| 0 1 1 0 | |
| 0 1 1 1 | NON-COMPRESSED STRIP |
| 1 0 0 0 | |
| 1 0 0 1 | |
| 1 0 1 0 | |
| 1 0 1 1 | |
| 1 1 0 0 | |
| 1 1 0 1 | ALL WHITE STRIP |
| 1 1 1 0 | ALL BLACK STRIP |
| 1 1 1 1 | |

FIG. 5A

| E | D | 9 | B |
|---|---|---|---|
| E | 8 | 1 | 5 |
| A | 4 | 0 | 2 |
| C | 7 | 3 | 6 |

FIG. 8

CONTINUOUS TONE CODES

| 0 1 | P0 P0 P0 P0 | P1 P1 P1 P1 | R0 | R1 |

2 "PRINT FONT CODES" (P0 & P1)
RUN (R0 & R1)

| 1 0 1 0 | P P P P | R R R R |

1 "PRINT FONT CODE" (P)
RUN (R R R R)

| 1 0 0 | B B B B | D0 D1 D2 D3 D4 |

1 "PRINT FONT CODE" BASE
(B B B B)
FOLLOWING CODES MAY BE SAME
(DX = 0) OR 1 GREATER (DX = 1)

| 1 0 1 1 | V0 V0 V0 V0 | V1 V1 V1 V1 |

2 Vertical Data Patterns
V0 and V1

| 1 1 | M0 M0 M0 M0 M0 | M1 M1 M1 M1 M1 |

2 Match FONT Patterns M0 and M1

FIG. 39

GRAYSCALE AND PROCESSED DATA

```
BCBB CCBC FCFD BCBC BBBC BCAC CCBC BBBC BCBC BBBC BCBC CCBC
8988 9989 FCFD BBBC BCBC BCBB BCCC BCBB BCAC BCBC BCBB BCAC
8989 9999 9EFD BCBC CCCC BCAC CCBC BCCC BCBC BCCC BCBB CCAC
8999 9999 9EFD BCCC BCAC BCAC CCBC BCBC BCBC BCBC BCCC BCBC

AABB BCBC BCBA ABAB ABAC A3AB ACAB ABAC ABAB AB9A AB9B 9BAA AAAB ABAB ACAA ACAB
ACBC BBBC BBBB BBBB BBBC ABBC ABBC ABBC ABBC ABAA AB9B 9BAA ACAC BBAB BCAA ACAB
CCCC BBBC BBBC ABBC ABBB ACBC BCBB ABBC BCBB ABAB ABAB 9BAC ACBC BBAB BCAA AAAB
ACBB BBBC BBAA BCBA AAAC ACBB ACAC ACBB ABBA ACBC ABAC ABAC 9BAA ACAB AAAB BCAA AAAA

M M
        0 1    VVVV      C    C    C    C    C    C    C    C    C    C    C
        5 B    0123
A       0010   1011 1111 0111 1111 1111 1111 1111 1111 1111 1111 1111 0011 0011
        0111   1111 0111 1111 1111 1111 1111 1111 1111 1111 1111 1111 0111 0111
        0111   1111 0111 1111 1111 1111 1111 1111 1111 1111 1111 1111 1111 1111
        0111   0111 0111 1111 1111 1111 1111 1111 1111 1111 1111 1111 0111 0111

COMPRESSED DATA CODE IN BINARY AND HEX FORMAT

STRIP 1

| 0 | 0 | 0 | 0 | 0 | 0 | 0 | 0 | 0 | 1 | 0 | 0 | 004 |
|---|---|---|---|---|---|---|---|---|---|---|---|---|
| 0 | 0 | 0 | 0 | 0 | 1 | 0 | 0 | 0 | 0 | 1 | 1 | 043 |
| 0 | 1 | 0 | 1 | 0 | 0 | 0 | 0 | 1 | 1 | 1 | 1 | 50F |
| 0 | 0 | 0 | 0 | 1 | 1 | 0 | 1 | 0 | 1 | 0 | 0 | 0D4 |
| 1 | 1 | 1 | 1 | 0 | 0 | 1 | 0 | 0 | 0 | 0 | 0 | F20 |
| 0 | 0 | 0 | 0 | 1 | 0 | 0 | 0 | 1 | 1 | 0 | 0 | 08C |

STRIP 2

| 0 | 0 | 0 | 0 | 0 | 0 | 0 | 0 | 0 | 1 | 0 | 0 | 004 |
|---|---|---|---|---|---|---|---|---|---|---|---|---|
| 0 | 0 | 0 | 0 | 0 | 1 | 0 | 0 | 0 | 0 | 1 | 0 | 042 |
| 1 | 0 | 0 | 1 | 0 | 0 | 0 | 1 | 0 | 1 | 0 | 0 | 914 |
| 0 | 0 | 0 | 0 | 0 | 1 | 0 | 0 | 0 | 0 | 1 | 1 | 043 |
| 0 | 1 | 0 | 1 | 0 | 0 | 0 | 0 | 1 | 1 | 1 | 1 | 50F |
| 0 | 0 | 0 | 0 | 0 | 1 | 0 | 0 | 1 | 0 | 1 | 0 | 04A |
| 1 | 0 | 0 | 1 | 0 | 1 | 0 | 0 | 0 | 0 | 0 | 0 | 940 |

COMPRESSED DATA CODE IN BINARY AND HEX FORMAT
(Contd.)

FIG. 40B

| STRIP 3 | | | | | | | | | | | | | |
|---|---|---|---|---|---|---|---|---|---|---|---|---|---|
| 0 | 0 | 0 | 0 | 0 | 0 | 0 | 0 | 0 | 1 | 0 | 0 | | 004 |
| 0 | 0 | 1 | 0 | 1 | 1 | 1 | 1 | 1 | 0 | 0 | 0 | | 2F8 |
| 1 | 0 | 1 | 0 | 0 | 0 | 0 | 1 | 0 | 0 | 0 | 0 | | A10 |
| 1 | 0 | 1 | 0 | 1 | 0 | 0 | 1 | 0 | 1 | 1 | 1 | | A97 |
| 1 | 1 | 1 | 0 | 0 | 1 | 0 | 0 | 0 | 1 | 0 | 1 | | E45 |
| 0 | 1 | 0 | 0 | 0 | 0 | 1 | 0 | 1 | 0 | 1 | 0 | | 22A |
| 0 | 0 | 1 | 0 | 0 | 0 | 0 | 1 | 0 | 1 | 0 | 0 | | 214 |
| 0 | 0 | 0 | 0 | 0 | 1 | 1 | 0 | 0 | 0 | 0 | 1 | | 061 |
| 1 | 0 | 0 | 1 | 0 | 1 | 1 | 0 | 1 | 0 | 1 | 1 | | 96B |
| 1 | 0 | 1 | 0 | 1 | 0 | 1 | 0 | 0 | 1 | 0 | 1 | | AA5 |
| 1 | 0 | 0 | 1 | 0 | 0 | 0 | 0 | 1 | 1 | 1 | 1 | | 90F |
| 0 | 0 | 0 | 0 | 0 | 0 | 1 | 0 | 0 | 0 | 0 | 0 | | 020 |
| 1 | 0 | 0 | 1 | 0 | 1 | 1 | 0 | 1 | 0 | 0 | 1 | | 969 |
| 1 | 1 | 1 | 0 | 1 | 1 | 1 | 0 | 0 | 1 | 1 | 1 | | EE7 |
| 0 | 0 | 0 | 0 | 0 | 0 | 0 | 0 | 0 | 0 | 1 | 1 | | 003 |
| 1 | 0 | 1 | 0 | 1 | 0 | 1 | 0 | 0 | 0 | 0 | 0 | | AA0 |
| 1 | 1 | 0 | 0 | 1 | 0 | 1 | 1 | 1 | 0 | 1 | 1 | | CBB |
| 1 | 0 | 1 | 1 | 0 | 0 | 1 | 1 | 1 | 1 | 1 | 0 | | B3E |
| 1 | 0 | 1 | 1 | 1 | 1 | 1 | 1 | 1 | 1 | 1 | 1 | | BFF |
| 1 | 0 | 1 | 0 | 1 | 1 | 0 | 0 | 1 | 0 | 1 | 1 | | ACB |
| 1 | 0 | 0 | 1 | 0 | 1 | 1 | 0 | 1 | 1 | 0 | 1 | | 96D |
| 0 | 1 | 1 | 1 | 0 | 0 | 1 | 0 | 1 | 1 | 0 | 0 | | 72C |
| 1 | 0 | 1 | 0 | 1 | 0 | 1 | 0 | 0 | 0 | 0 | 0 | | AA0 |
| 1 | 1 | 0 | 0 | 1 | 0 | 1 | 1 | 1 | 0 | 1 | 1 | | CBB |
| 0 | 1 | 1 | 0 | 1 | 0 | 1 | 0 | 1 | 1 | 0 | 0 | | 6AC |
| 0 | 1 | 1 | 1 | 0 | 0 | 1 | 0 | 1 | 0 | 0 | 0 | | 728 |
| 0 | 1 | 1 | 0 | 1 | 1 | 1 | 0 | 0 | 1 | 0 | 1 | | 6E5 |
| 1 | 0 | 0 | 1 | 0 | 1 | 0 | 0 | 0 | 1 | 1 | 0 | | 946 |

IMAGE DATA COMPRESSION/DECOMPRESSION

BACKGROUND OF THE INVENTION

The present invention relates generally to image data representative of a document to be duplicated and, more particularly, to a method and apparatus for compressing and decompressing image data to reduce the storage capacity or bandwidth required for storage or transmission of the data, respectively.

Data compaction is well known in electrical systems to reduce storage space for data storage or channel bandwidth for data transmission. Data compaction techniques have been applied to image data produced by duplication or facimile systems. In such systems, a document is scanned to generate raw image data with individual data bits corresponding to small elements of the document. The small elements are referred to as picture elements or pels and the image data defines whether each pel is a white, no-print element or a black, print element. The need for compaction of such raw data is appreciated by observing that one square inch of a document may comprise a 400×400 matrix of pels for a high quality ink jet duplicating system, i.e., 160,000 pels per square inch.

One known data compaction technique is run-length encoding wherein the number of repetitive occurrences of data bits of a given data state is transmitted rather than the bits themselves. According to run-length encoding, a 5 bit word representing the number 32 is transmitted instead of 32 consecutive and identical data bits. Such run-length encoding has been improved in accordance with a technique referred to as Huffman coding. In Huffman coding, the most commonly encountered run lengths in a document type to be duplicated are allocated to the shortest code words such that fewer bits are required to represent a document.

Run-length and Huffman coding result in varying length code words which generally represent individual scan lines of a document to be duplicated. A dual line compaction technique is disclosed in U.S. Pat. No. 3,916,095, issued to Weber et al. on Oct. 28, 1975. In the disclosed dual line compaction technique, data pairs, i.e., adjacent upper and lower elements of two scan lines, are encoded. Data pairs having the same data state (both white or both black) are run-length encoded and transitional data pairs (upper black/lower white or upper white/lower black) are individually encoded. The coding technique of the cited patent is an adaptive word-length code which results in varying length code words.

While these prior art encoding arrangements provide data compaction for storage or transmission of image data, the resultant varying length code words must be decoded from the first encoded word to the last encoded word. Often, it is desirable to decode an encoded data block either from the first-to-the-last encoded data word of from the last-to-the-first encoded data word. The ability to decode in either direction adds versatility and permits a larger variety of applications. For example, a document may be scanned and encoded in one direction and decoded and printed in the opposite direction to facilitate duplication of the document.

Thus, the need exists for an improved compression/-decompression method and apparatus for use, for example, in a duplicating system wherein image data representative of a document is compressed, stored, decompressed in either direction and then utilized to duplicate the document.

SUMMARY OF THE INVENTION

In accordance with the present invention, data generated, for example, by scanning a document to be duplicated, is assembled to represent scanned strips of the document with each strip comprising a plurality of scanned lines. The assembled scanned line data are read in parallel to form data words corresponding to columns of the scanned strips. The data words are reviewed and consecutive data words which are identical to one another are counted to determine run lengths of consecutive, identical data words. Each run of data words read and the corresponding run length are encoded into a fixed-length coded word with all fixed-length coded words being concatenated to represent the document.

The individual data words are encoded by employing Huffman coding such that the data words which are statistically more likely to occur in a class of documents to be duplicated are encoded using a lesser number of data bits than data words which are less likely to occur. The Huffman encoded data words and the run lengths for the data words are combined to form the fixed-length coded words.

A synchronization word prefixes each encoded scanned strip to enable the fixed-length coded words to be decoded or decompressed from either direction. When decompressed in the forward direction, the synchronization words indicate characteristics of the scanned lines of coded data to be decoded, while in the reverse direction, the synchronization words verify characteristics of the information just decoded.

For quality duplication of documents, appropriate portions of each document are classified as either text or continuous tone. While text and continuous tone data may be encoded using the same technique, continuous tone data does not have the same grouping characteristics or appreciable run lengths for such groups. Accordingly, it is advantageous to encode continuous tone data by means of a different technique than that used for text data. In accordance with the present invention, data representative of both text and continuous tone portions of a document can be intermixed in the compressed code representation even though encoded differently.

For continuous tone data, data words comprising at least two columns of a scanned strip are encoded again using a combination of Huffman coding to encode the multiple column data words and run-length encoding to specify the runs of such data words. Preferably, continuous tone data words comprise four columns of a scanned strip and are referred to as print fonts. Continous tone data words can also comprise two columns of a scanned strip referred to as match fonts. Finally, if neither print fonts nor match fonts can be identified, raw data is encoded.

When a document includes both text and continuous tone portions, additional synchronization words are inserted into the encoded data to indicate transitions from text to continuous tone and from continuous tone to text herein collectively referred to as continuous tone/text changes. Also, at least the first and last data words of each scan strip are defined as text data and the prefixing synchronization words include an indication that the strip begins with text data. Bidirectional decoding is thus possible since decoding from either direction initially commences on text data and continuous tone/text changes are indicated by an appropriate synchronization word.

In the interest of minimizing the size of the image data representing a document to be duplicated, the coded words generated to represent each scanned strip are reviewed and uncoded scanned strip data is substituted for generated coded words in the event that the generated coded words exceed the uncoded scanned strip data. Such excesses can occur due to numerous continuous tone/text changes in a given scanned strip.

When one or more uncompressed data strips are inserted into an otherwise compressed data representation of a document to be duplicated, synchronization words are used to both prefix and suffix all such uncompressed data strips. The uncompressed synchronization words identify any such strips as being uncompressed image data with the suffixing synchronization words providing for bidirectional decoding of any uncompressed data strips.

It is, therefore, an object of the present invention to provide an improved method and apparatus for compressing and decompressing image data representative of a document to be duplicated.

It is another object of the present invention to provide an improved method and apparatus for compressing and decompressing image data representative of a document to be duplicated wherein scanned document strips comprising a plurality of individual scanned lines are encoded by means of a combination of Huffman and run-length encoding into fixed-length coded words with synchronization words being provided such that a compressed data block can be decompressed from either direction, i.e., from the first encoded data word to the last encoded data word or from the last encoded data word to the first encoded data word.

It is an additional object of the present invention to provide an improved method and apparatus for encoding and decoding image data representative of a document to be duplicated wherein encoded data words representative of scanned document strips are reviewed and uncoded scanned strip data are substituted for the encoded data words in the event that the encoded data words exceed the uncoded scanned strip data.

It is yet another object of the present invention to provide an improved method and apparatus for encoding and decoding scanned image data strips representative of a document to be duplicated wherein text data and continuous tone data are encoded utilizing different encoding techniques with encoded text and continuous tone data being included in the same data block with synchronization words interposed therebetween to indicate switches between the two data types, at least the initial and the final data words of each scanned strip being defined as text data to permit the initial decoding of each encoded data strip to commence as text data decoding whether decoding is initiated from the beginning of the strip or the end of the strip.

Other objects and advantages of the present invention will be apparent from the following description, the accompanying drawings and the appended claims.

BRIEF DESCRIPTION OF THE DRAWINGS

FIGS. 2A-2E show text codes used for encoding the text vertical pattern groupings of FIG. 1.

FIG. 5 shows print fonts and the corresponding hexidecimal identification numbers for the print fonts which are used to encode continuous tone data.

FIG. 5A is a matrix used to preprocess continuous tone data prior to compression in accordance with the present invention (see drawing sheet 9).

FIGS. 6 and 7 show left match fonts and right match fonts, respectively, which are used to encode continuous tone data.

FIG. 8 shows continuous tone codes for encoding continuous tone data in accordance with the present invention.

FIG. 9 shows synchronization code words in accordance with the present invention.

FIGS. 38 through 40B illustrate an example of image data encoded in accordance with the present invention.

DETAILED DESCRIPTION OF THE INVENTION

In accordance with the present invention, image data obtained by scanning a document to be duplicated is encoded on a scanned strip basis. The scanned strips of the image data each comprises a plurality of contiguous scanned lines, preferably four scanned lines, across the document to be duplicated. A review of a variety of documents to be duplicated reveals characteristic statistics on the vertical bit patterns which occur within scanned strips of the documents. Text portions of documents have statistical pattern characteristics which differ from the statistical pattern characteristics of continuous tone portions of the documents.

Figures 1, 3, 4:
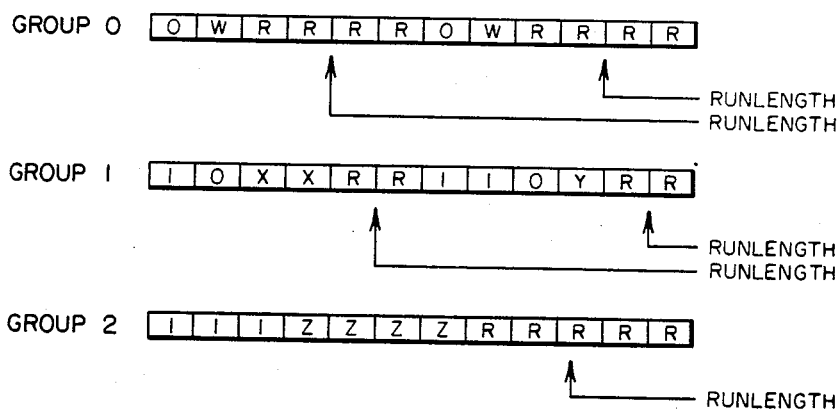
FIG. 1 shows vertical data pattern groupings for text data strips.
FIG. 3 is a table showing the number of text code bits required for encoding the text vertical data pattern groupings of FIG. 1 (see drawing sheet 1).
FIG. 4 shows the code fields and run length fields for the text codes of FIG. 2 (see drawing sheet 1).

For text portions of documents to be duplicated, certain vertical bit patterns occur more often and are repeated more times, i.e., have longer run lengths, than others. In FIG. 1, vertical bit patterns are grouped into three categories by frequency of occurrence. These bit pattern groupings are representative of text portions of documents in general. The group 0 patterns are high occurrence patterns, group 1 patterns are medium occurrence patterns and group 2 patterns are low occurrence patterns. Since continuous tone portions of a document do not generate data having the same grouping characteristics as text data nor having runs of such patterns of appreciable lengths, separate coding techniques are preferably utilized for text and continuous tone data.

In image processing systems, for example document duplicators, it is desirable to compress data such that it can be decompressed from either direction, i.e., from the first compressed coded word to the last compressed coded word or vice versa. For example, a document may be scanned in one direction and then printed in the opposite direction. Such operation may be particularly applicable to duplex (double-sided) documents and to both duplex and simplex (single-sided) documents for selected paper handling arrangements. Reversibility is assured by utilizing fixed-length coded words for both text and continuous tone, synchronization words within the compressed data and the forced definition of text data characteristics for the data at the beginning and end of each coded scanned strip as will become apparent.

Each of the fixed-length coded data words for text data is made up of a combination of a code defining a vertical bit pattern and a run length defining the consecutive number of occurrences of that bit pattern within a scanned strip. The vertical bit pattern codes are generated using Huffman coding which, as previously mentioned, is a data coding technique wherein more frequently used data patterns are represented by fewer data bits and less frequently used data patterns are represented by more data bits as is well known in the art.

In the present invention, Huffman coding of the vertical bit patterns shown in FIG. 1 maximizes the storage capacity of fixed-length coded words. Since the high occurrence or usage patterns tend to have longer run lengths, the use of a lesser number of bits to represent the high usage patterns frees bits in the fixed-length coded words to represent the longer run lengths of these vertical bit patterns.

Preferably 12 bit coded data words are utilized; however, any convenient fixed-length can be utilized in accordance with the present invention. The 12 bit text compression code formats comprise combinations of Huffman and run-length type codes as shown in FIG. 2. Each Huffman code defines the corresponding group number and data pattern with more bits being required as pattern usage decreases. The number of bits required to define each group and the associated data are shown in FIG. 3. As can be seen in FIG. 3, the high usage group 0 patterns require only 2 bits to define the group number and data pattern, while the low usage group 2 patterns require 7 bits to define the group number and data pattern.

While a fixed 12 bit coded word length is utilized in the illustrative embodiment of the present invention, each 12 bit word representative of text data may contain one or two coded data words, i.e, either one 12 bit data word or two 6 bit data words.

Group 0 data words are identified by an initial 0 with the data pattern for all "zeros" being identified by a "zero" bit and the data pattern for all "ones" being identified by a "one" bit. Group 1 data words are identified by an initial 10 or an initial 110 with two bits identifying the vertical data pattern for an initial 10 and one bit identifying the vertical data pattern for an initial 110.

Group 2 data words are identified by an initial 111 group identifier followed by four data bits to identify the vertical data pattern for the group 2 data words. It is noted that all vertical data patterns may be represented by data words within the group 2 data coding. Default to a group 2 data word occurs when an initial 6 bit data word has been constructd as the first 6 bit word location or word 0 of a 12 bit coded data word and a final 6 bit data word cannot be formed, for example, due to a change in data type from text to continuous tone or the exhaustion of the input data at the end of a scanned strip.

There are two special cases of text coded words, one for the group 0 coded words and one for the group 2 coded words. The special case for the group 0 coded words is a special 12 bit coded word comprising two 6 bit coded words both for all white or both for all black data words. The special 12 bit group 0 coded word permits concatenation of the run lengths of the two 6 bit coded words to form an 8 bit run-length code which can define run lengths of from 17 to 256 vertical patterns (see FIG. 2A).

The special case for the group 2 coded words comprises unitary run-length coded words corresponding to the codes unique to group 2, i.e., the group 2 codes complementary to the group 0 and group 1 codes (see FIG. 2E). Such special case group 2 coded words are provided as the second 6 bit word or word 1 of a 12 bit coded word by means of a truncated group 2 code word when a 6 bit group 0 or group 1 coded word has been placed in the word 0 position of a 12 bit coded word and the next vertical data pattern does not fit within either group 0 or group 1 and, hence, could not otherwise be encoded as a 6 bit word to complete a 12 bit coded word. In the event a 6 bit word has been encoded for the word 0 position and a 6 bit word cannot be formed from group 0, group 1 or the special truncated group 2 coded words for the word 1 position, a 12 bit group 2 coded word is formed such that only complete 12 bit encoded words are contained within a compressed or coded data block.

Once the group and data bits have been determined for a run of a given vertical data pattern, run lengths for the corresponding pattern are added to the group and data bits to define complete 12 bit data words as shown in FIG. 4. As can be seen in FIG. 4, the run lengths which can be encoded vary for different code groups. For example, group 1 codes have run-length fields of 2 bits which allow the defined code to be repeated up to four times.

It has been determined that the run lengths for all white and all black vertical data patterns generally fall into two length categories, i.e., 1-16 and 17-256. Accordingly, the group 0 codes are formed into either 6 bit or 12 bit data formats. For the 6 bit group 0 data words, 4 bits of run-length data are included to provide for the runs of all white or all black vertical data patterns from 1 to 16 patterns in length. In the special case group 0 coded words determined by the group and data pattern being the same in the two 6 bit data words, the run lengths from the two 6 bit group 0 coded words are concatenated to provided an 8 bit run-length code which permits the definition of run lengths from 17 to 256 data patterns.

As previously noted, continuous tone data does not have the vertical pattern grouping characteristics of text data nor are the runs as long as in text data. However, for areas of constant grayscale value, continuous tone data has repeated four-by-four matrix (4 pel by 4 scan) patterns of print/no-print data. These patterns are called print font patterns herein and a representative selection of print font patterns for a given continuous tone preprocessing operation is shown in FIG. 5. The continuous tone preprocessing leading to the print fonts of FIG. 5 is performed by comparing the grayscale values of a block or matrix of pels to the values in a corresponding block or matrix as shown in FIG. 5A. If a pel grayscale value exceeds the corresponding matrix value, a 1 or print is assigned to the pel; otherwise, a 0 or no print is assigned to the pel.

Where the continuous tone grayscale values vary by as much as ±2 from the average grayscale value, the left and right halves of four-by-four patterns or the left two-by-four and the right two-by-four (2 pel by 4 scan) patterns tend to repeat. These left and right half matrix patterns are referred to as match fonts herein and representative groupings for the left and right half match fonts are shown in FIGS. 6 and 7, respectively, for the noted continuous tone preprocessing. Since the print font and match font patterns are repeatedly generated in portions of continuous tone data, continuous tone data compression is performed on a pattern recognition basis in accordance with the present invention.

While the print fonts and match fonts which are coded by the continuous tone compression technique handle the vast majority of the continuous tone data representative of a document to be duplicated, short sections of continuous tone data do not correspond to either print fonts or match fonts and, hence, are encoded as raw data. Twelve bit continuous tone compression codes are shown in FIG. 8 to provide for print font, match font or raw data encoding.

The code designator 01 identifies a coded word which identifies two different print fonts (P0 and P1) with a maximum run length of 2 for each print font. P0 and P1 define the print fonts, for example, as shown in FIG. 5, and are binary representations of the hexadecimal print font identification numbers shown.

The code designator 1010 identifies a coded word representing a single print font having a run length represented by RRRR which may have a maximum run length of 16.

The code designator 100 identifies a coded word which represents two consecutive print fonts with a fixed run length of 5 blocks. The lower value print font is represented by the base value BBBB. Each of the five individual blocks is then identified by the designators D0-D4, with each block varying from the base by its designator. If the designator is 0, the coded print font equals the base print font and if the designator is 1, the coded print font is one greater than the base print font.

The code designator 1011 identifies a coded word which contains two uncompressed one-by-four (1 pel by 4 scans) vertical data patterns. V0 is the binary representation of the left data pattern while V1 is the right data pattern. Two coded 1011 data words are required to represent a four-by-four pel area. While V0 and V1 can be included in raw data form, they also can be encoded in any appropriate manner. For example, the codes set out in FIGS. 2C and 2D for text encoding can be utilized to identify the vertical data patterns.

The code designator 11 identifies a coded word which represents two match font patterns. M0 is the left half match font pattern and M1 is the right half match font pattern. Each pattern occurs only once and, hence, each coded 11 data word represents a four-by-four pel area. M0 and M1 are binary representations of the hexadecimal match font identification numbers shown in FIGS. 6 and 7.

Synchronization (SYNC) code words are utilized to designate the commencement of compressed data strips, to designate continuous tone/text changes, to setoff uncompressed data strips within a data block and to identify all white and all black data strips. The basic SYNC code format is shown in FIG. 9 and comprises 8 leading zeros and 4 SYNC code characterizing bits: 0011—continuous tone/text change; 0100—normal compressed strip; 0111—non-compressed strip; 1101—all white strip; and, 1110—all black strip. The remaining SYNC code characterizing bit patterns are undefined and may be used for additional features if desired.

Normal compressed strips are data strips in which, after compression, the compression ratio is greater than one. If after compression the compression ratio is found to be less than one, that strip is designated as an uncompressed data strip and transmitted as raw data. All white and all black scanned strips are strips that contain either all white or all black data and are designated by a single synchronization code word. The compression ratio for an all white or all black strip is 1,154:1.

Figure 38:
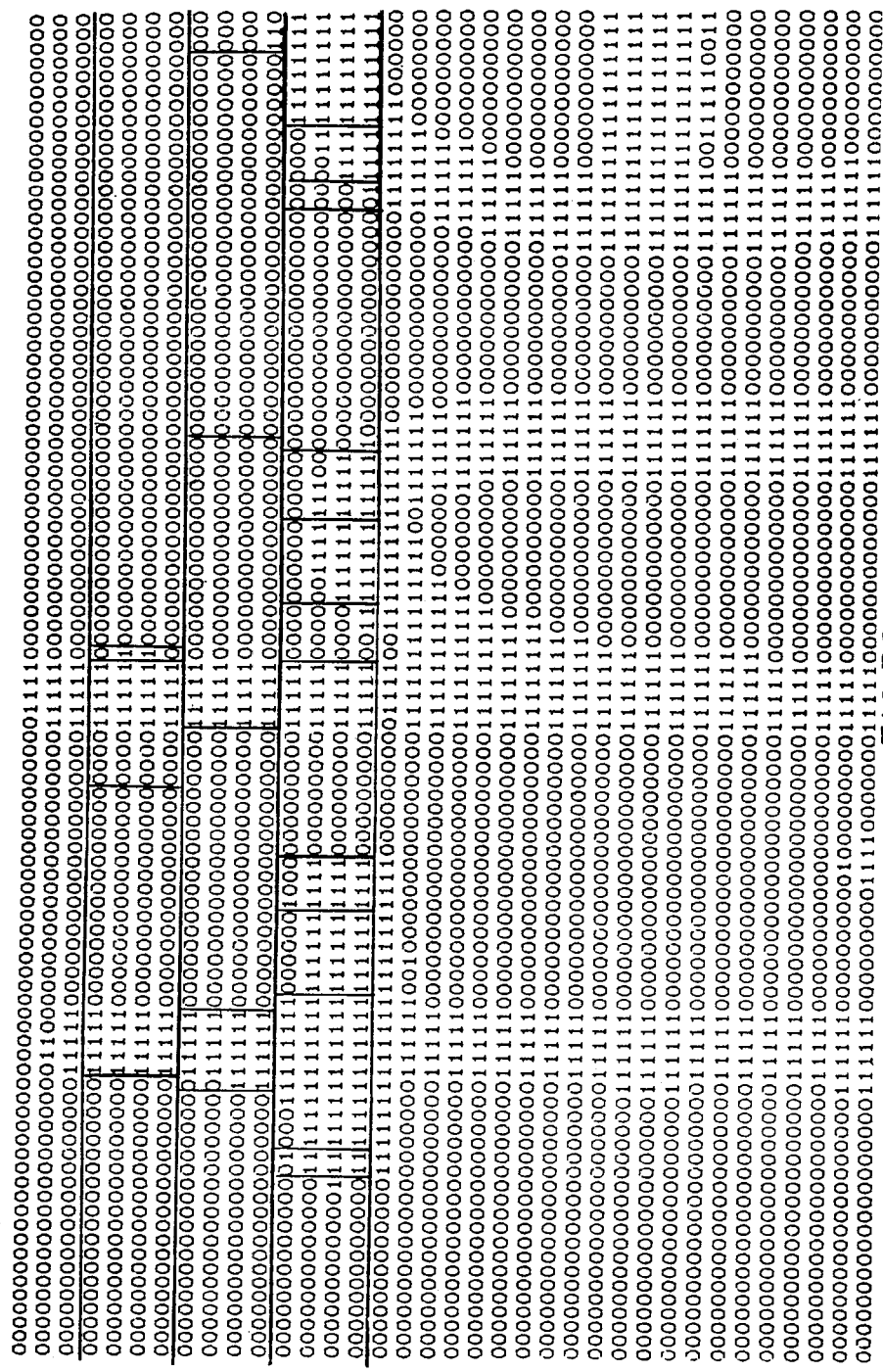

To illustrate data compression in accordance with the present invention, three strips of digitized textual data are shown in FIG. 38. It is assumed that strip 3 eventually becomes continuous tone data, a portion of which is shown in FIG. 39. The continuous tone data of FIG. 39 is shown as initially scanned grayscale data and as digital data after the grayscale data has been processed by applying the matrix shown in FIG. 5A as previously described. The resulting text, continuous tone and synchronization code words in accordance with the present invention are shown in FIG. 40.

An illustrative implementation of the text compression and decompression system in accordance with the present invention will now be described with reference to FIGS. 10 through 37. It is noted that throughout the schematic diagram of FIGS. 11 through 25 and 27 through 37, figure members or block diagram components are provided next to conductors receiving incoming signals to identify the circuitry or components which generate the incoming signals.

Figure 10:
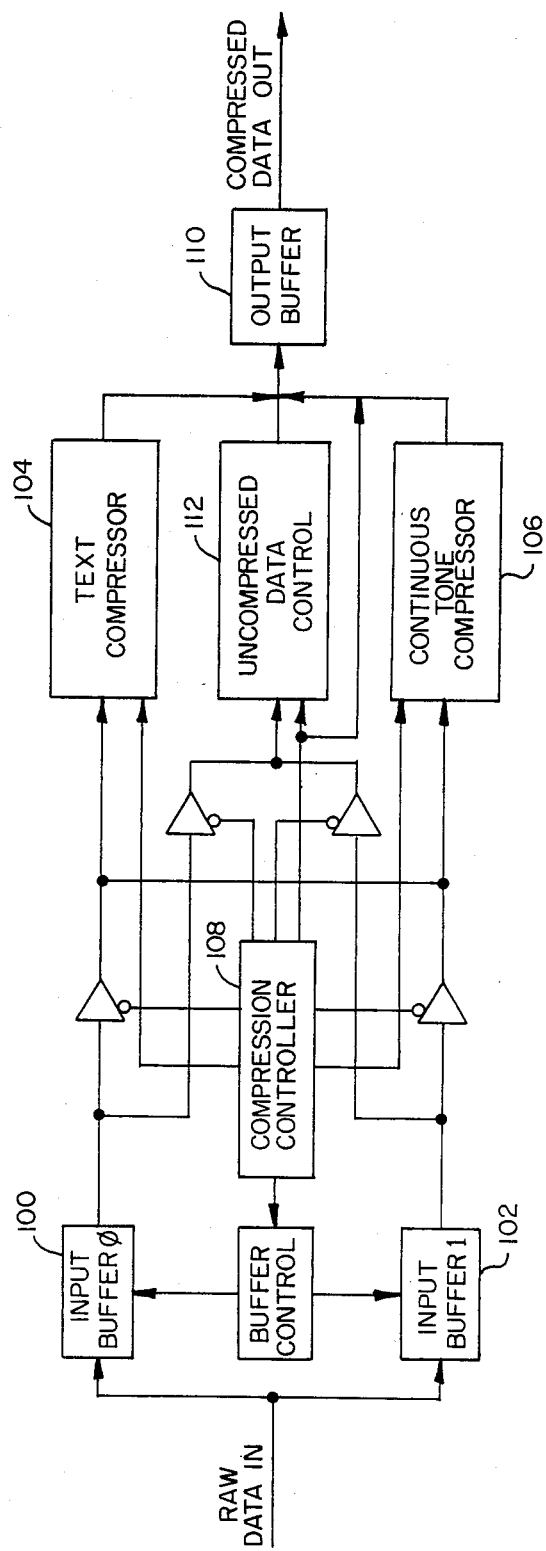
FIG. 10 is a block diagram of a data compression system in accordance with the present invention.

FIG. 10 is a block diagram of a data compression system in accordance with the present invention. Image data is input to data compression input buffers 100 and 102 on a strip basis. One strip is equivalent to the amount of data that is generated by four scans across a document to be duplicated. In the illustrative embodiment, the data is arranged in strips of 3,464 five bit words of data in each strip. Four of the bits represent data produced by document scanning and one bit designates whether the data is text data or continuous tone data. A determination of whether data is text data or continuous tone data can be made in a variety of ways. For example, the reader is directed to U.S. Pat. No. 4,251,837 which is hereby incorporated by reference.

Since data is inputed to the data compression system on a strip basis, data compression operates in a cycle based on each strip of data inputed to the compression system. The input buffers 100 and 102 are operated in a "ping-pong" fashion such that after a strip of data is loaded into one of the buffers compression begins on the data contained in that buffer while the next strip of data is being transferred to the other buffer. Only one of the data compressors is enabled at any one time depending upon the type of data to be compressed, i.e., text data compressor 104 for text data or continuous tone data compressor 106 for continuous tone data.

For text compression, one 5 bit word is transferred to a text compressor 104 at a time, and for continuous tone compression, four 5 bit words are transferred to a continuous tone compressor 106 at a time. A compression controller 108 controls which of the compressors 104,106 are enabled at any one time. Compressed data from both compressors 104,106 is transferred to an output buffer 110 where it is accumulated on a strip basis.

If the compression of a strip results in compressed code greater than the raw image data, i.e., a compression ratio less than 1, the raw image data is transferred directly from the appropriate input buffer 100,102 through an uncompressed data control 112 with the uncompressed, raw image data being written over the compressed data previously stored in the output buffer 110. After a strip of data (compressed or uncompressed) is satisfactorily contained within the output buffer 110, it is transferred to an appropriate storage device or transmission channel (not shown).

The text compressor 104 compresses text data by representing runs of recurring data words or vertical data patterns with either 12 bit or 6 bit coded words as previously described with reference to FIGS. 1 through 4. Raw text data is recieved by the text compressor in the form of 5 bit words which are received into the input section of the text compressor shown in FIG. 11. The 5 bit data words comprise the four bits defining the vertical data pattern and a fifth bit identifying the data as text (or continuous tone).

The data is initially transferred into a next buffer 105. The data contained in the next buffer 105 addresses a programmable read-only memory (PROM) 107. PROM 107 produces an input grouping and a compression code corresponding to the data contained within the next buffer 105. The fifth data bit identifying the data pattern as a text data pattern is sent to the text compressor state controller of FIG. 12 to indicate that the next data is either text or continuous tone data. The data in the next buffer 105 is transferred to a present buffer 109 on the next positive transition of a clock control signal.

Simultaneously with the transfer of the contents of the next buffer 105 to the present buffer 109, the input grouping and compression code corresponding to the data is also transferred to the present buffer 109. As the present buffer 109 is loaded, a new word is transferred into the next buffer 105, with the new word similarly addressing the PROM 107. Once both next and present buffers 105 and 109 are loaded with data, data compression begins.

Since data compression relies on the observation that data occurs in repetitive patterns, i.e., runs, a run detector is used to detect whether two consecutive words of data are the same or different. The run detector comprises a 4 bit magnitude comparator 111 which receives the 4 bit data patterns contained within the next buffer 105 and the present buffer 109. If the data in both the next and present buffers 105,109 are the same, the present equal next (PEQN) signal is activated, inverted by an inverter 113, and passed to the text compressor state controller of FIG. 12 as a present not equal next (PNNE) signal. The text compressor state controller of FIG. 12 generates control signals for the text compressor. The compressor state controller comprises programmable read-only memories (PROMs) 120 which are programmed to generate the required control signals.

Figure 13:
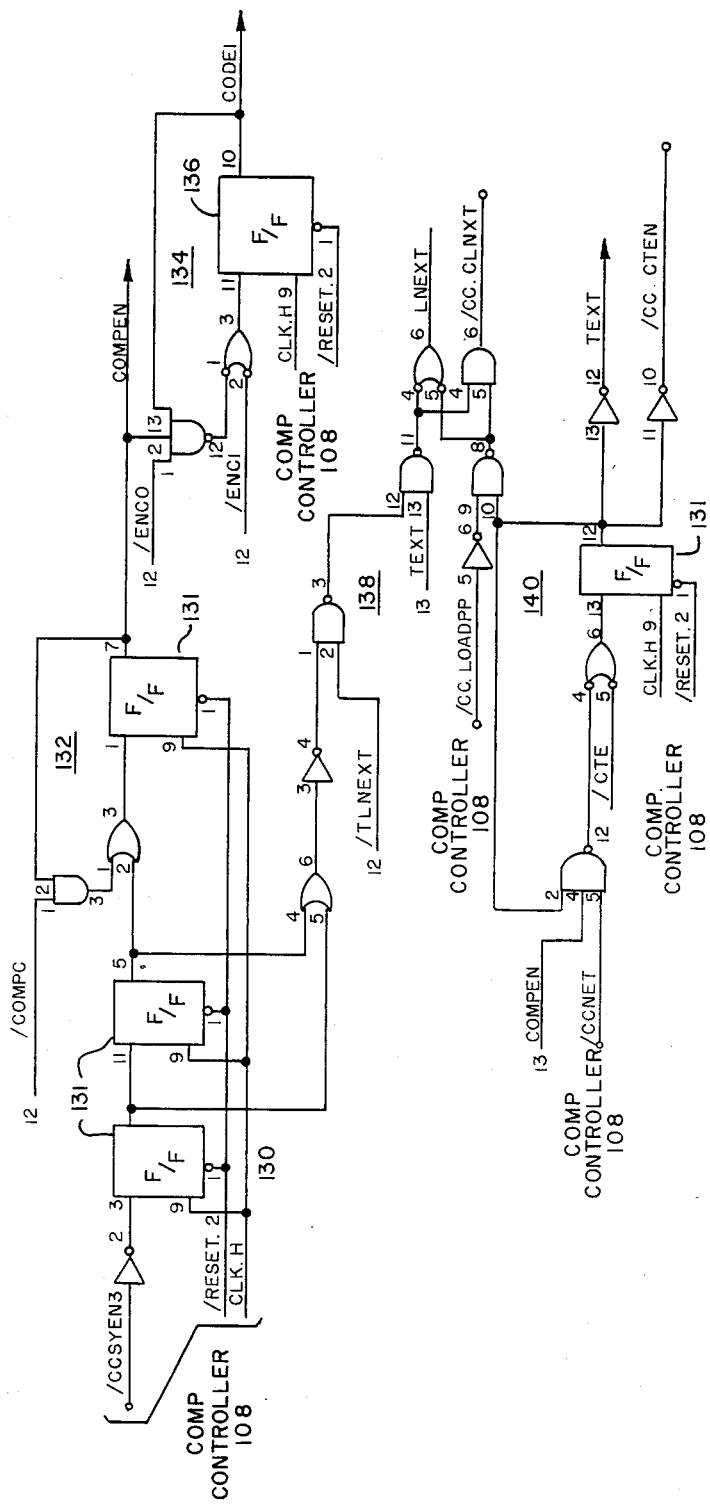
FIG. 13 is a schematic diagram of additional text compressor control circuitry of the present invention.

Additional text compressor control circuitry is shown in FIG. 13. Compressor start-up control 130 controls the text compressor during start-up before all parameters and conditions have been established for normal text compressor operation. The text compressor is started by a pulse from the compression controller 108, with the start-up control 130 controlling the input section of the text compressor to load data into both the next buffer 105 and the present buffer 109 in preparation for the actual start of data compression.

Compressor enable control 132 generates a compression enable (COMPEN) signal to enable either the text compressor 104 or the continous tone compressor 106. Code word enable controller 134 generates a signal identifying which one of two 6 bit coded words are being generated by the text compressor. Text compression commences with a code 1 flip-flop 136 reset such that a CODE1 signal is inactive. The CODE1 signal is inactive when the text compressor has not produced the first 6 bit word (word 0) of a standard 12 bit coded word which it is attempting to generate.

The text compressor state controller activates the CODE1 signal by setting the code 1 flip-flop 136. When the CODE1 signal is active, the text compressor is compressing data to generate the second 6 bit word (word 1) to complete a 12 bit coded data word. Thus, when the CODE1 signal is active, it signifies to the text compressor state controller that the last coded word generated by the text compressor was a 6 bit word occupying the word 0 position in a 12 bit word. With the CODE1 signal inactive, the text compressor attempts to produce either word 0 of two 6 bit words or a full 12 bit word.

Figure 11:
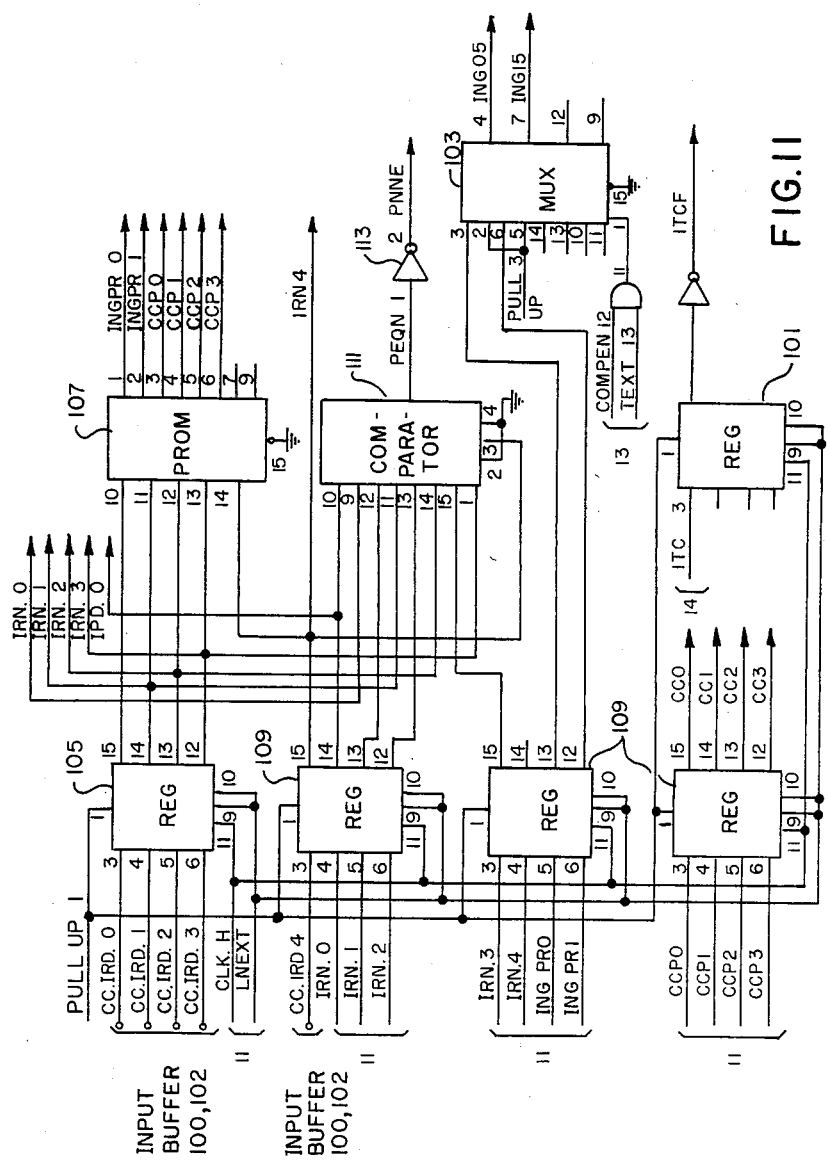
FIG. 11 is a schematic diagram of the input section of the test compressor of FIG. 10.

Load next data word circuitry 138 controls the input section of FIG. 11 to load the next data word to be compressed into the next buffer 105.

Text and continuous tone compressor enable control circuitry 140 enables either the text compressor 104 or the continuous tone compressor 106 (see FIG. 10). As previously noted, only one of the compressors is enabled at any given time. The text signal is activated on start-up since data compression always starts in the text mode. Continuous tone enable is activated by the compressor state controller of FIG. 12 when the data in the next buffer 105 of the text compressor's input section of FIG. 11 is continuous tone data. Control is returned to the text compressor by activating the text signal when the data that is in the next buffer 105 is text data.

Figure 14:
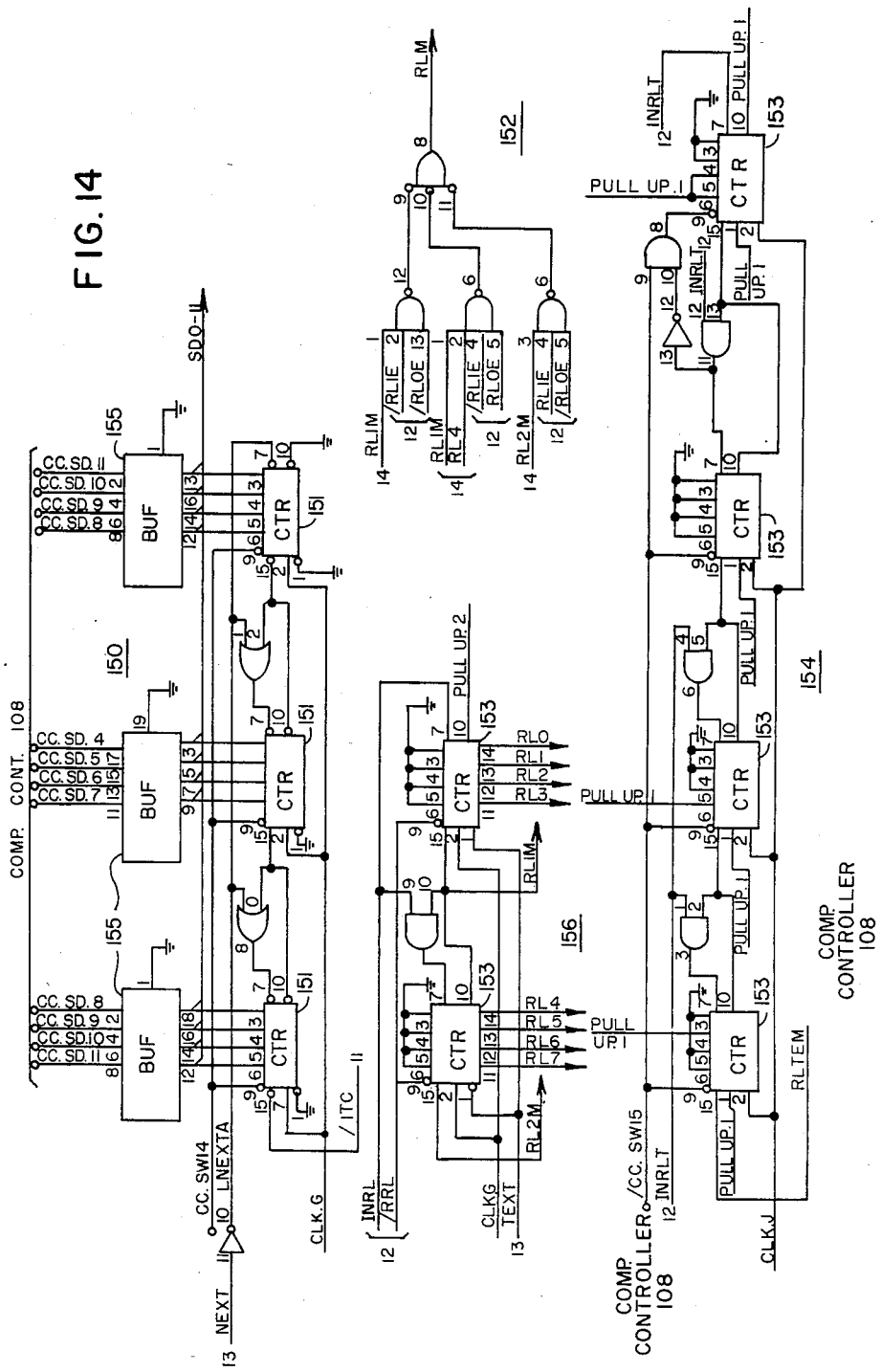
FIG. 14 is a schematic diagram of counting and associated circuitry utilized for compressing text data.

A number of text compressor counter circuits are required for text compression. These counter circuits and other associated circuitry are shown in FIG. 14. A buffer empty counter 150 counts the number of data transfers made to the text compressor 104 and the continuous tone compressor 106 from one of the input buffers 100 or 102. The buffer empty counter 150 indicates to the text compressor's state controller of FIG. 12 when the associated input buffer 100 or 102 is empty so compression of the strip contained therein can be terminated.

The buffer empty counter 150 is a countdown counter. The number of data words in the associated input buffer 100 or 102 is loaded into the buffer empty counter 150 prior to any transfers of data from the input buffer to the text compressor. After the buffer empty counter 150 is loaded with the number of data words in the input buffer, the transfer of data to the text compressor can start.

Each time a word is transferred from the input buffer, the buffer empty counter 150 is decremented by one. When all the data in the input buffer 100 or 102 has been transferred to a compressor, the buffer empty counter is at 0 to signal the text compressor state controller of FIG. 12 that the last word of data has been transferred out of the input buffer and it is time to terminate the compression.

Figure 12:
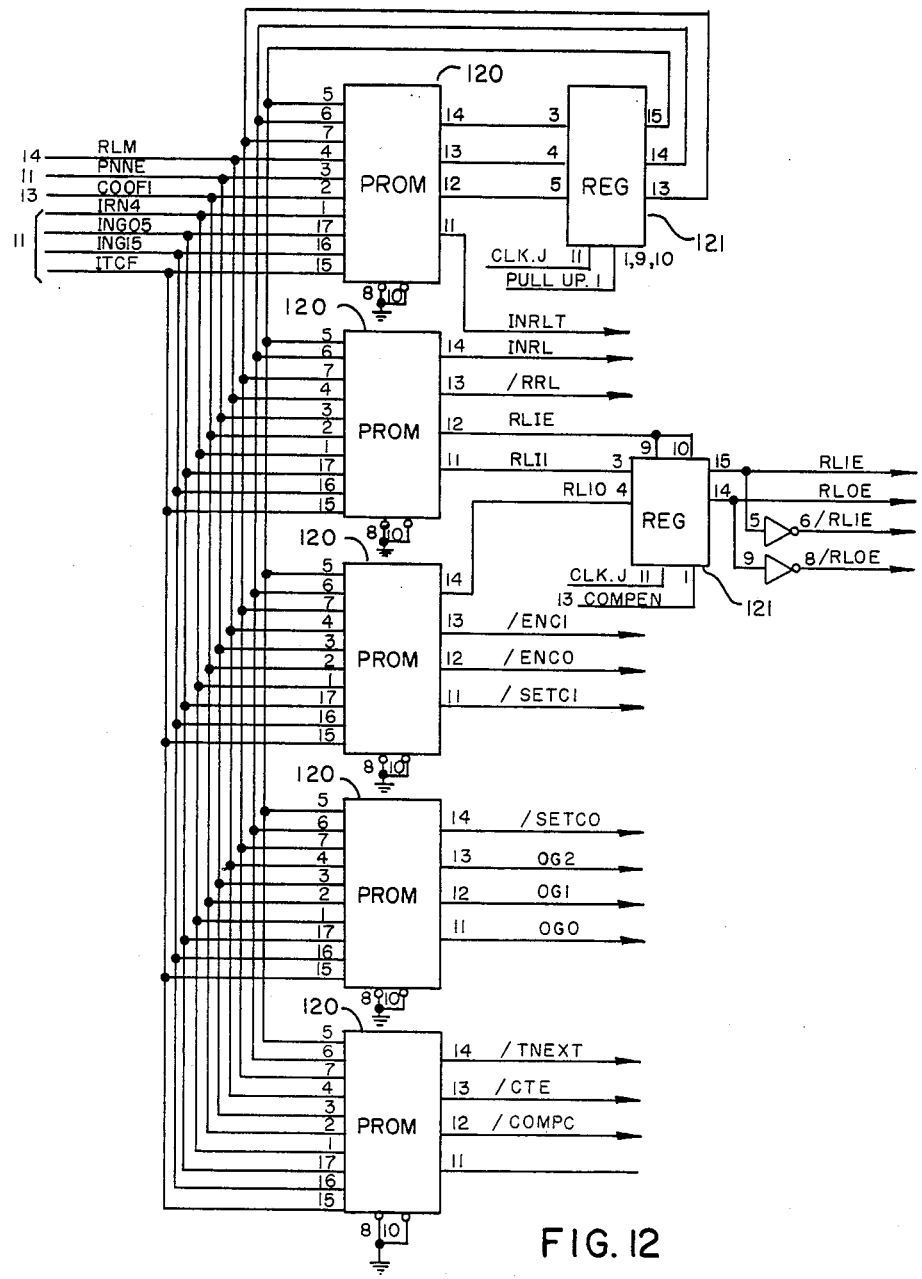
FIG. 12 is a schematic diagram of a text compressor state controller for the text compressor of FIG. 10.

A run-length maximum indicator 152 generates signals for the text compressor state controller of FIG. 12 indicating the run length is a maximum for a particular type of coded data word that the text compressor is working to produce. The three run lengths which the text compressor considers to be maximums are 16, 32 and 256. Each run-length maximum is associated with a particular type of compressed coded data word as previously described with reference to FIGS. 1 through 4. The text compressor state controller signals the run-length maximum indicator 152 to enable the proper run-length maximum for the coded data word which the text compressor is working to produce. When a maximum run length is obtained, the maximum run-length indicator signals the text compressor state controller by activating the run-length maximum (RLM) signal.

A run-length total counter 154 counts the total run length for a strip which is being compressed and indicates when the run length total equals 3,464. Since there are 3,464 data words in each data strip, the run-length total counter is used as a check to verify when exactly one image data strip has been compressed. The run-length total counter 154 is loaded with a preliminary count such that, when the counter is incremented 3,464 times, a terminal count occurs to activate a run-length total equal maximum (RLTEM) signal. If correct data compression has occurred, RLTEM is activated just after the input buffer has emptied its content of one strip of raw image data to the text and continuous tone compressors and that data has been compressed.

Figure 15:
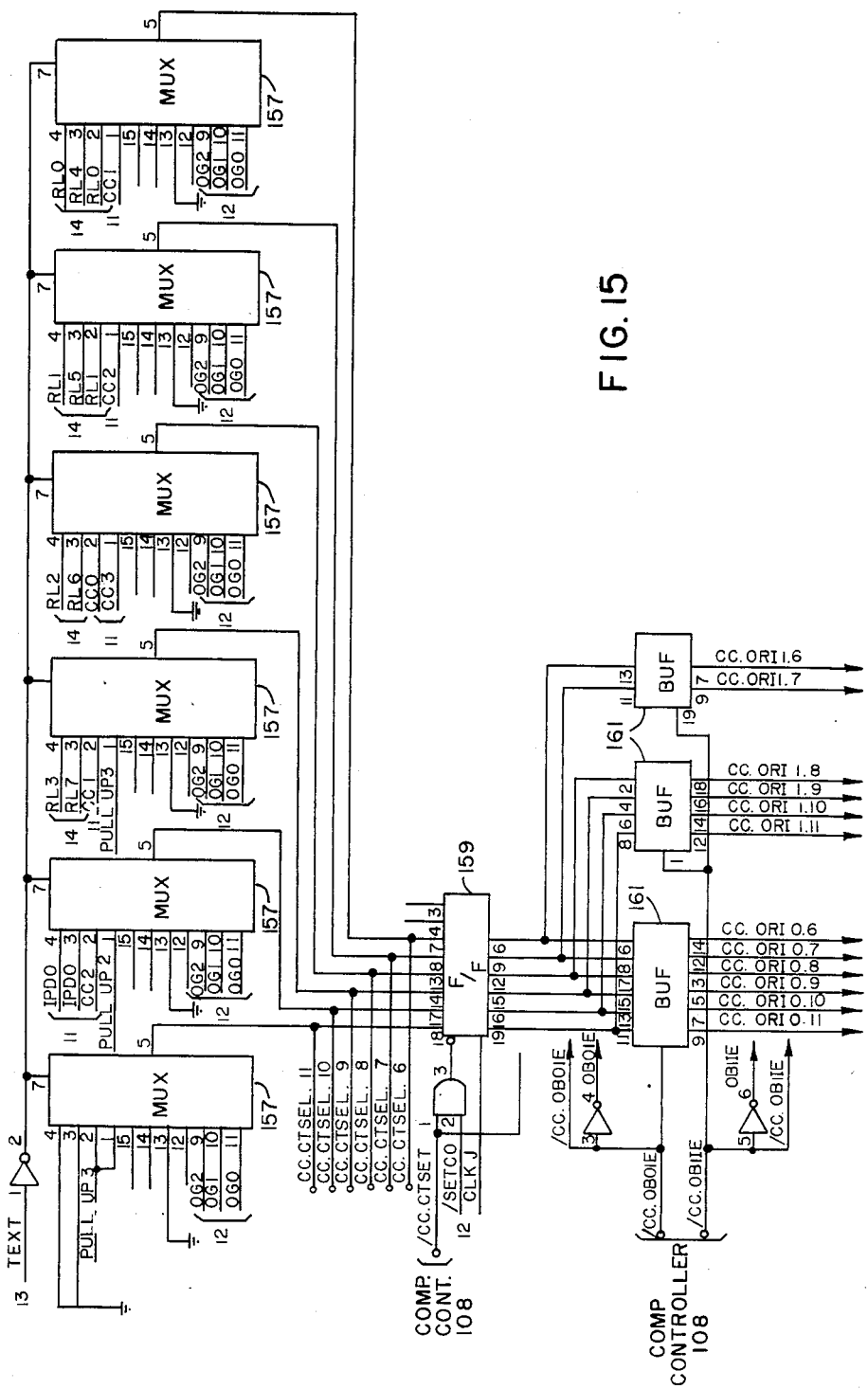
FIGS. 15 and 16 are schematic diagrams of the text compressor word 0 code generator and the text compressor word 1 code generator, respectively.
Figure 16:
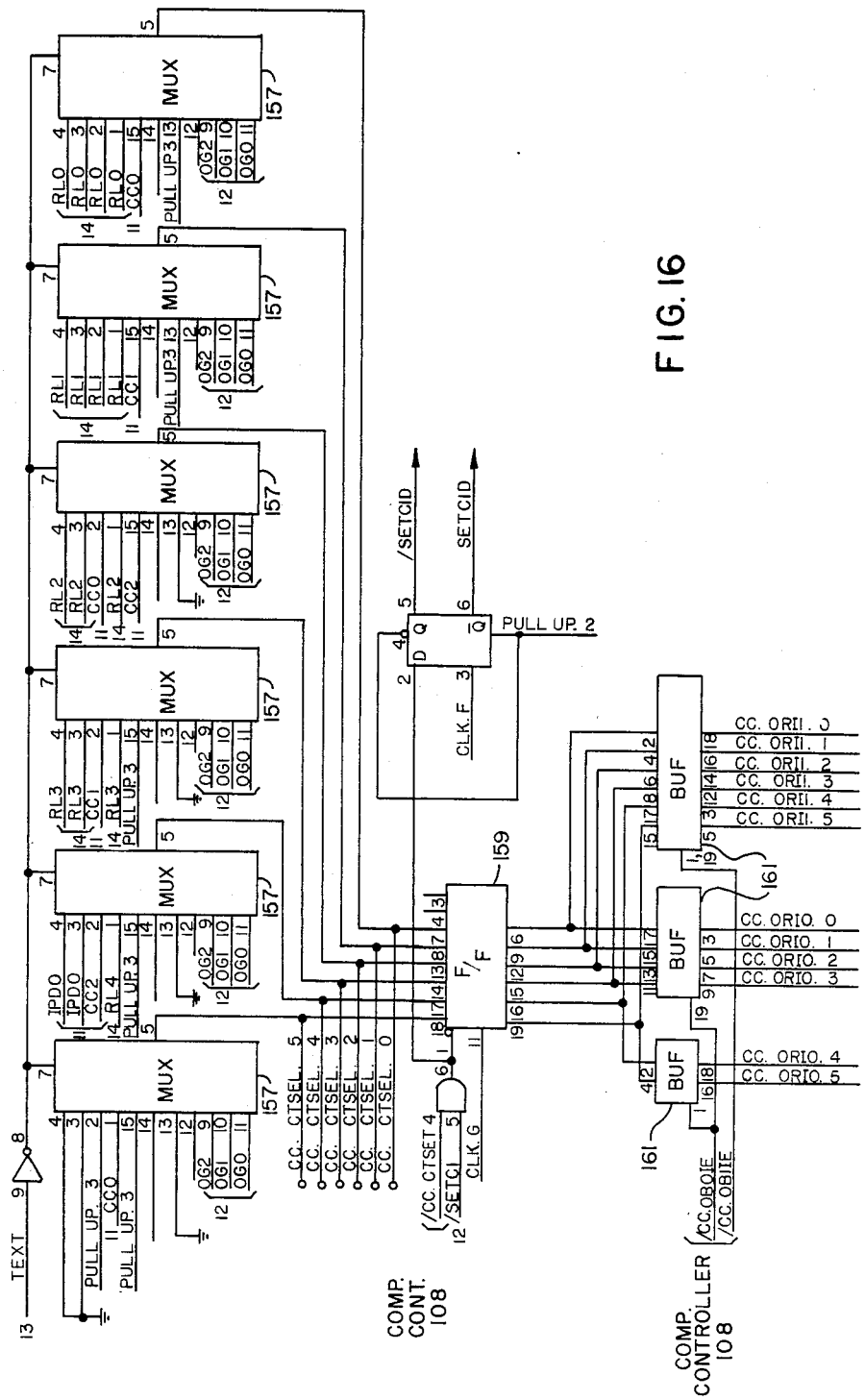

Code generation circuitry is shown in FIGS. 15 and 16 for producing the compressed text coded data words representative of the raw image data inputed to the text compressor. A run-length counter 156 shown in FIG. 14 counts the number of consecutively occuring data words which are identical to one another, i.e., the run of those data words, for the text compressor. The run length is counted for each text coded data word as it is being produced, with the run length being provided to the coded word generators of FIGS. 15 and 16 to define the run-length portion of the coded data word.

The run-length counter 156 is reset to 0 when the text compressor is not enabled. Each time the text compressor state controller of FIG. 12 activates increment run length (INRL), the run-length counter 156 is incremented by 1. The run-length counter 156 also drives the run-length maximum indicator 152 to generate the various run-length maximum signals previously mentioned. The run-length counter 156 is loaded with zeros when the text compressor state controller activates reset run length (RRL) to prepare the run-length counter 156 for counting the next run of data words.

The compressed text coded data word generators of FIGS. 15 and 16 generate coded data words from signals received from the input buffer 102, the run-length counter 156, and the compressor state controller of FIG. 12. The compressed text coded word generators comprise 12 multiplexors 157, one for each bit of the standard 12 bit coded data word. The 12 multiplexors 157 are divided into two 6 bit groups, with each 6 bit group being responsible for generation of one of the 6 bit coded words generated during a compression, and both groups cooperating to produce a standard 12 bit coded word. The text coded words generated are as previously described with reference to FIGS. 1 through 4.

Compression codes CC0 through CC3 are generated by the PROM 107 of the compressor input section shown in FIG. 11. Also, an input present data 0 (IPD0) is generated by the compressor input section of FIG. 11. The run-length counts RL0 through RL7 are generated by the run-length counter 156 shown in FIG. 14. The text compressor state controller of FIG. 12 determines which format the compressed coded data word is to take by multiplexing one of the lines on each of the multiplexors 157 in the word generator under control of the output group signals 0G0 through 0G2 from the text compressor state controller of FIG. 12. By activating the appropriate output group signals, the compressed text coded data words take one of the formats shown in FIG. 2. The compressed text coded word generators operate only when the text compressor is enabled.

The outputs of the text code generators of FIGS. 15 and 16 are in a high impedance state when text is inactive. This permits the continuous tone compressor 106 to provide coded continuous tone data words on the same conductors for transmission to the output buffer 110. Since the compressed text coded data words can be produced in two parts, they can also be set in two parts. The text compressor state controller of FIG. 12 determines which part or parts is set by activating either set code 0 (SETC0) or set code 1 (SETC1), or both. These signals latch the compressed coded data words in the code generators.

Figure 17:
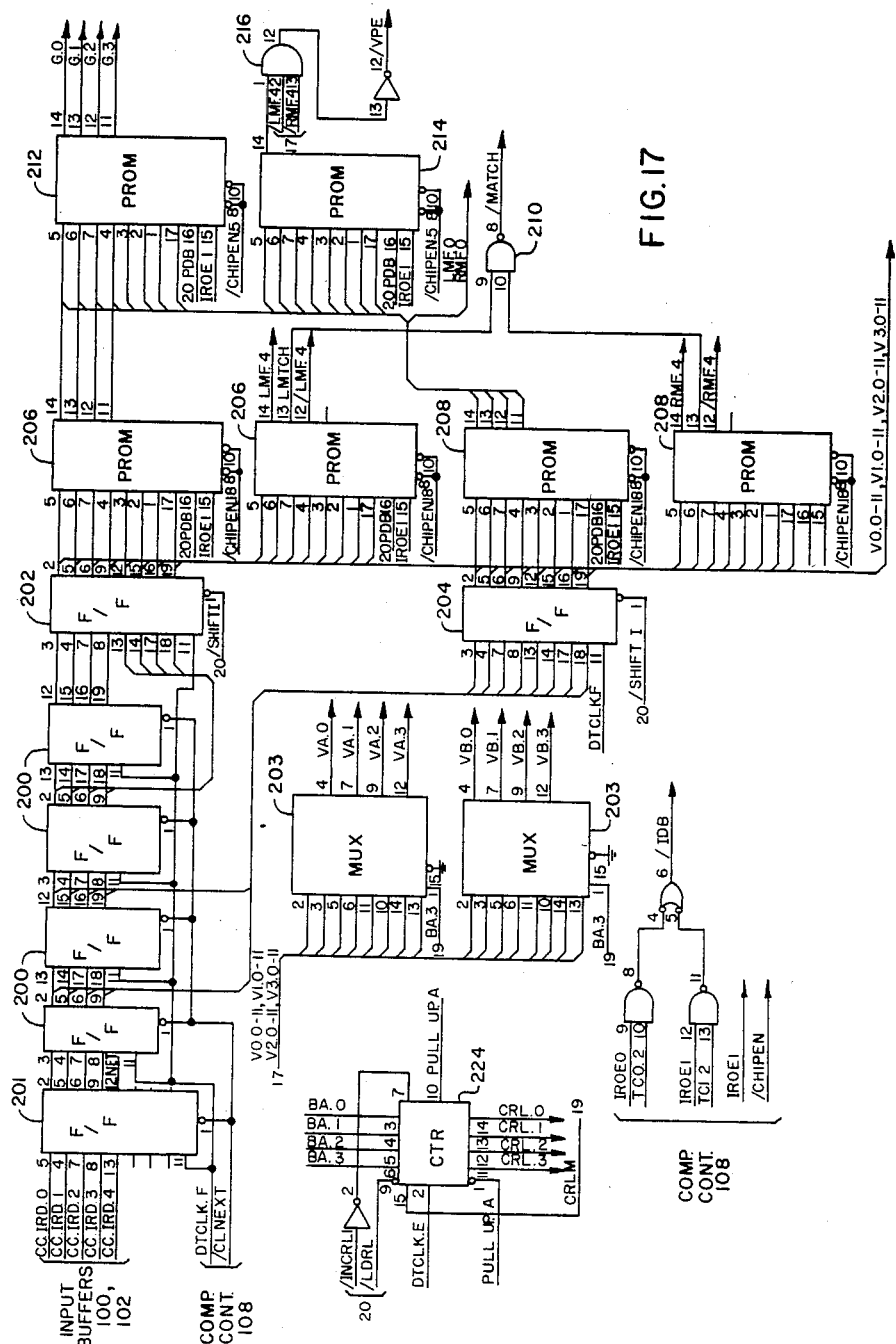
FIG. 17 is a schematic diagram of font determination circuitry for encoding continuous tone data.

The majority of continuous tone data is encoded as print fonts or match fonts with the rare portion of data not conforming to a print font or match font being inserted as raw data. Accordingly, four columns of vertical data must be considered for each continuous tone encoding operation. FIG. 17 shows the font determination circuitry. Four columns of continuous tone data are loaded into the registers 200 to effectively form a four-by-four matrix of continuous tone data. The data in the registers 200 is transferred into registers 202 and 204, with the register 202 receiving the data corresponding to the a left match font and the register 204 receiving the data corresponding to a right match font. The data contained within the registers 202 and 204 is used to address programmable read-only memories (PROMs) 206 and 208, respectively.

If a left match font is contained in the register 202, the identification of that left match font will be generated by the PROMs 206 and, if a right match font is contained within the register 204, the identity of the right match font will be generated by the PROMs 208. A left match font signal and a right match font signal are passed to a NAND gate 210 which generates a signal indicating that two valid match fonts were identified.

Selected ones of the left match fonts correspond to the left halves of print match fonts and selected ones of the right match fonts correspond to the right halves of print match fonts. The identifying signals of those left and right match fonts are passed to programmable read-only memories (PROMs) 212. In the event the match fonts identified by the PROMs 206 and 208 form a print font, the print font is identified by the PROM 212 and a valid print font signal is generated by a NAND gate 216. The match font signals are passed to a continuous tone output circuit shown in FIG. 18.

Figure 18:
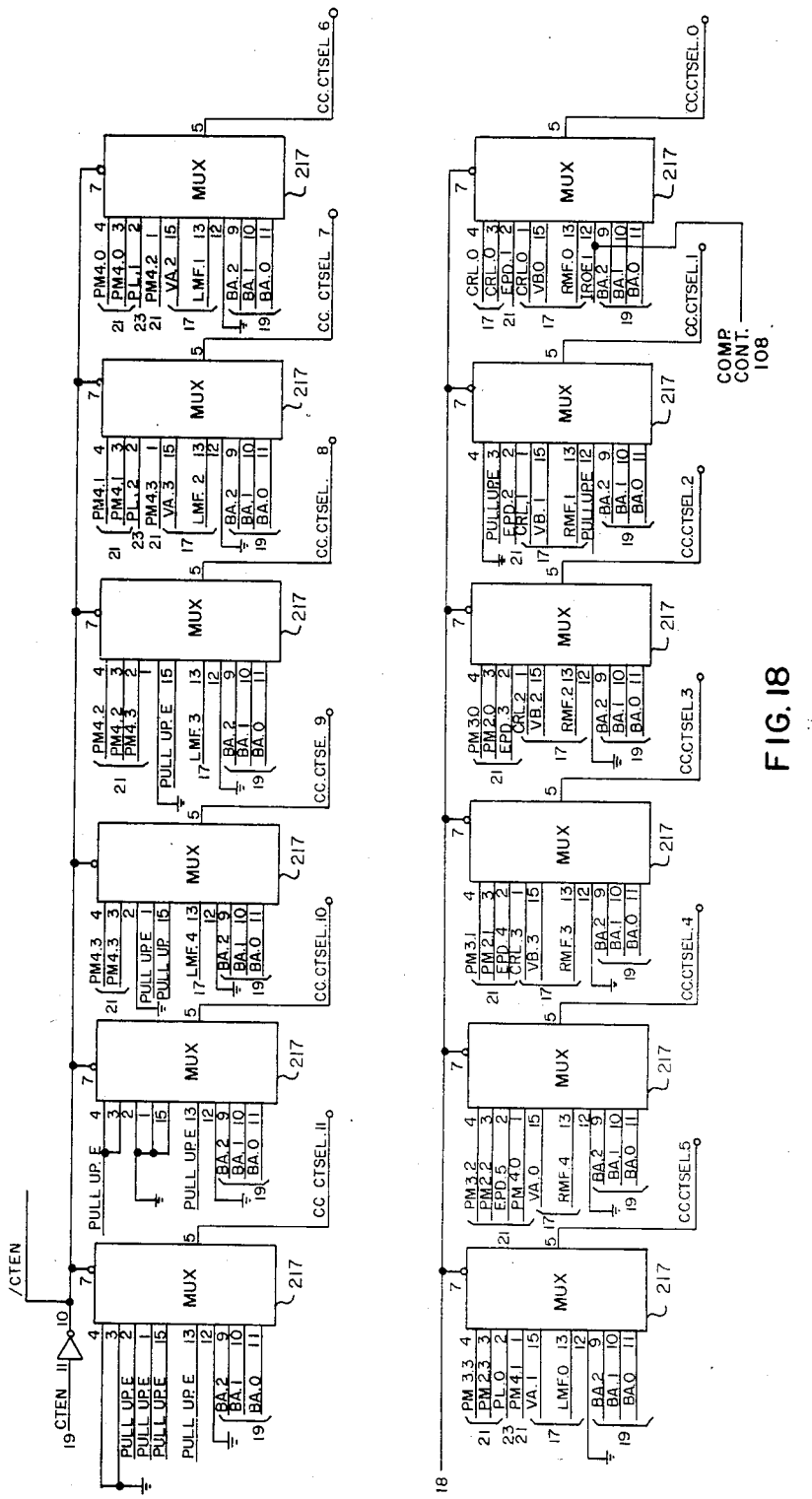
FIG. 18 is a schematic diagram of a continuous tone output selector circuit.
Figure 19:
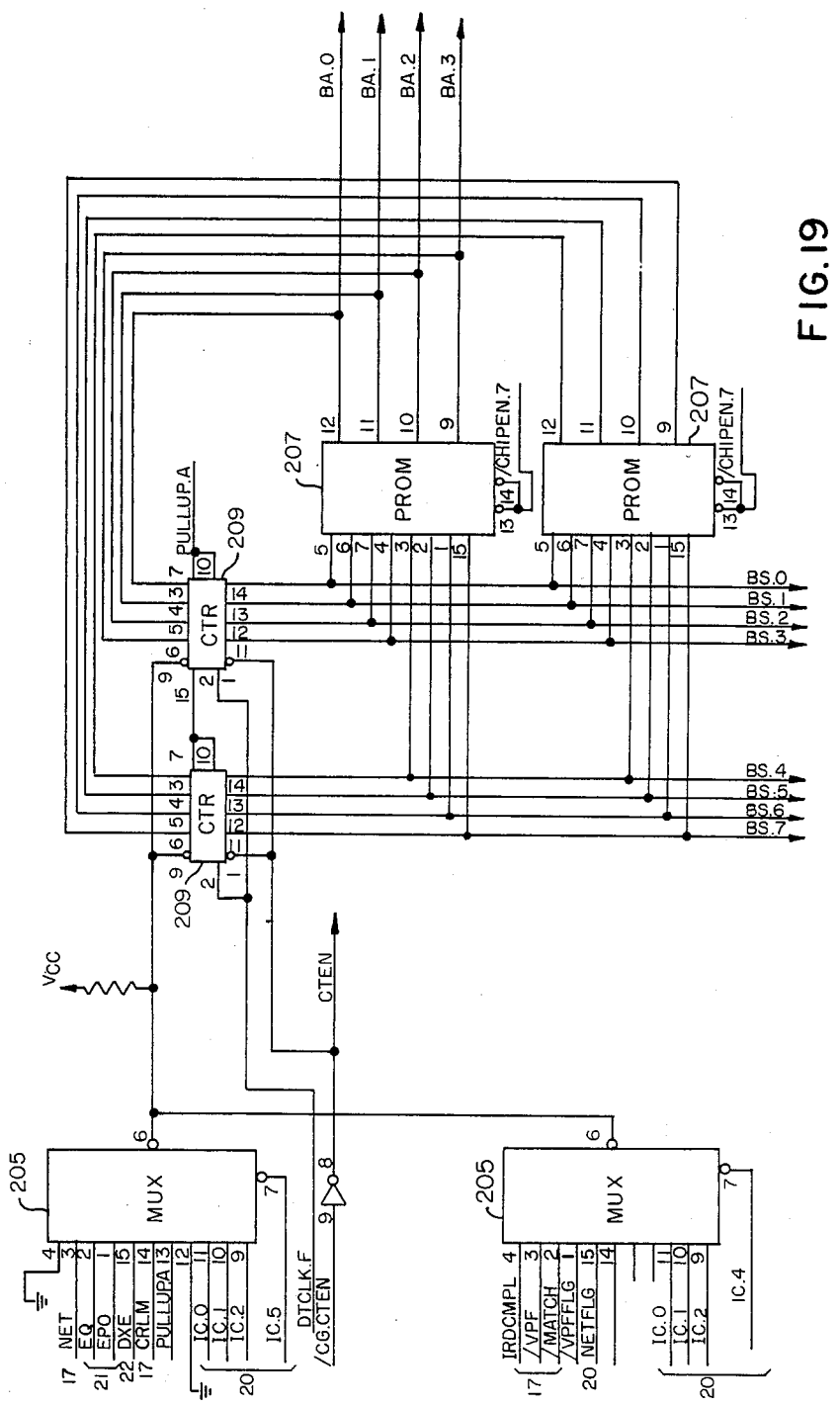
FIGS. 19 and 20 form a schematic diagram of a continuous tone compressor state controller.
Figure 20:
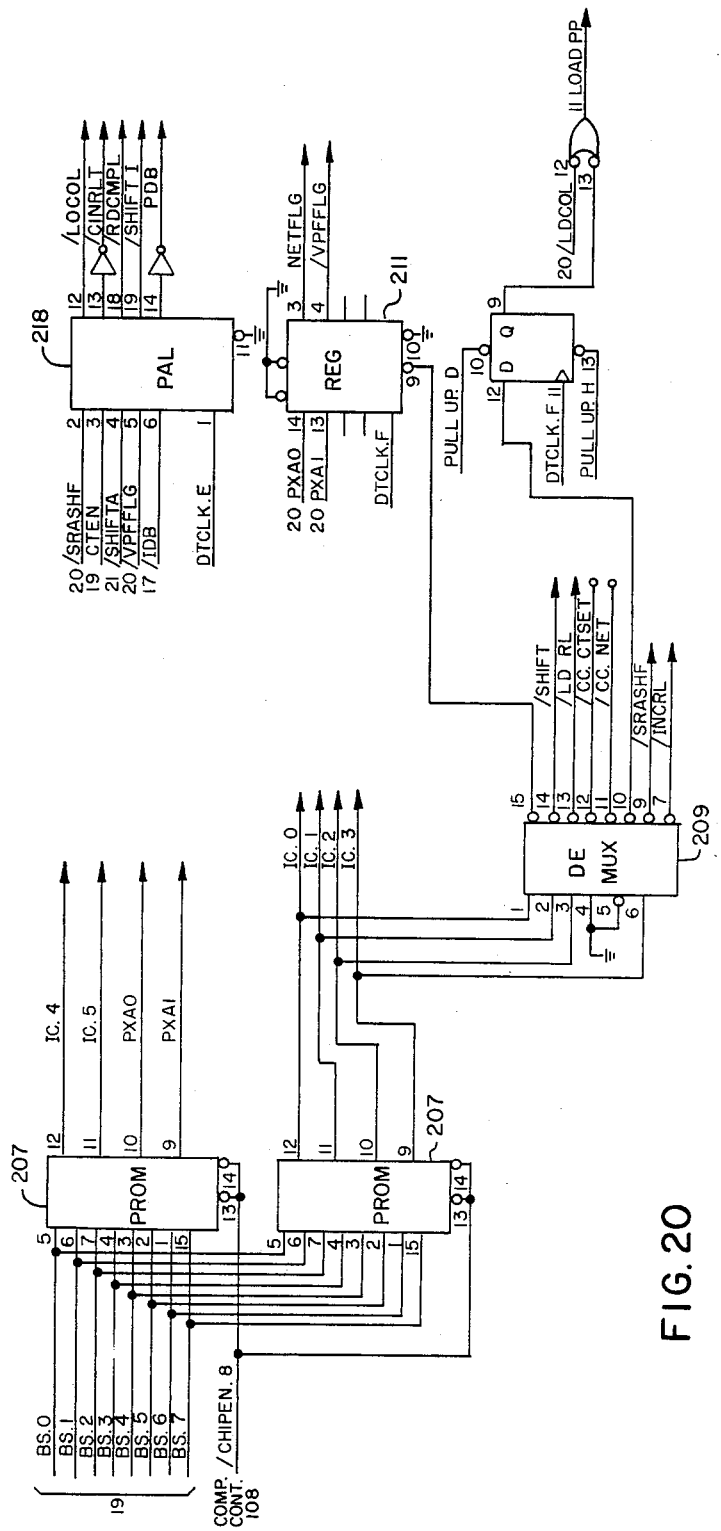
Figure 21:
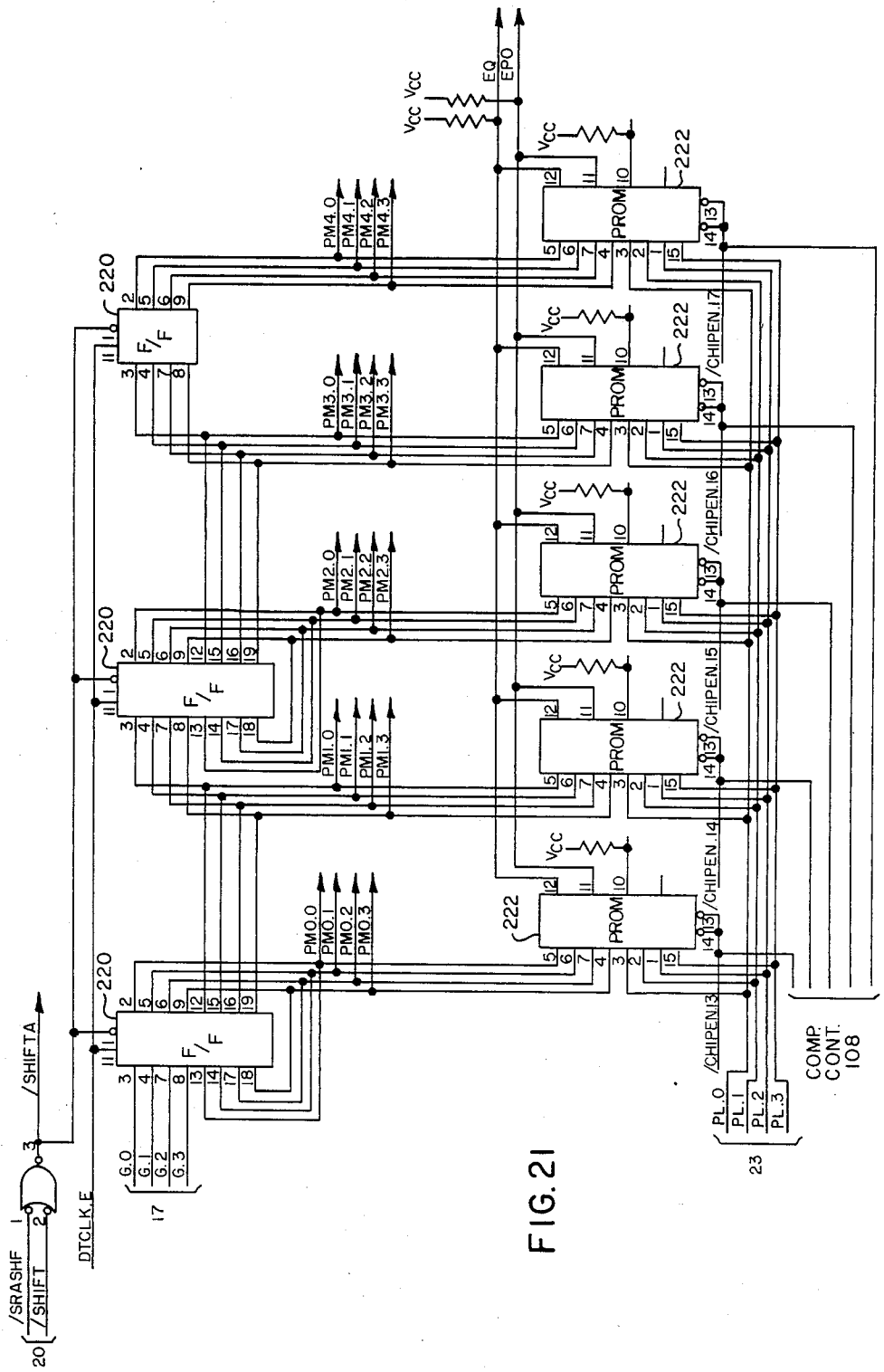
FIG. 21 is a schematic diagram of the continuous tone input registers and the circuitry for evaluating whether five successive print fonts are equal to one another or equal plus one.

The output circuit of FIG. 18 comprises twelve multiplexors or data selectors 217, the outputs of which are selected by the continuous tone state controller shown in FIGS. 19 and 20. It is noted that the programmable logic array 218 controls the loading of the four data patterns into the registers 200 shown in FIG. 17. Under the control of the continuous tone state controller, five successive print fonts generated by the PROM 212 are loaded into continuous tone registers 220 shown in FIG. 21. These five print font patterns are processed to determine what continuous tone code word should be generated.

Figure 22:
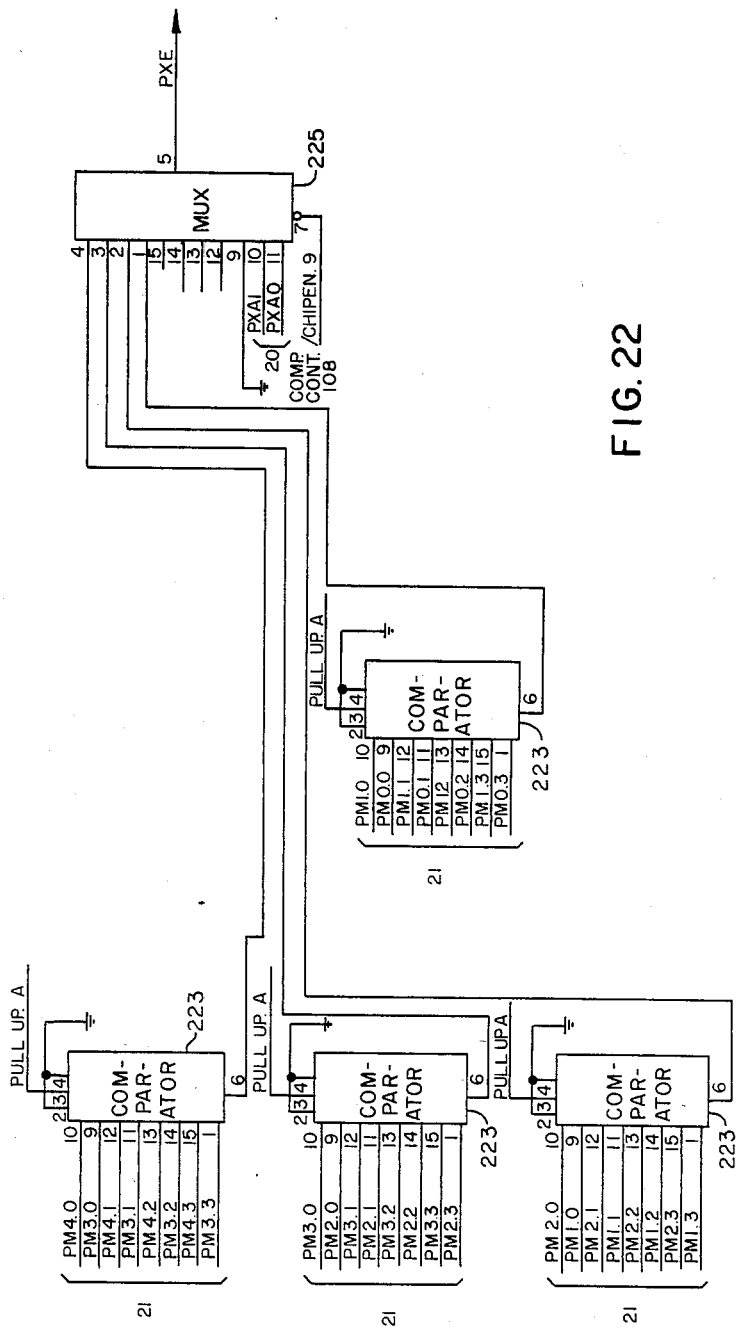
FIG. 22 is a schematic diagram of comparator circuits for determining whether a series of five recognized print fonts are equal to one another.
Figure 23:
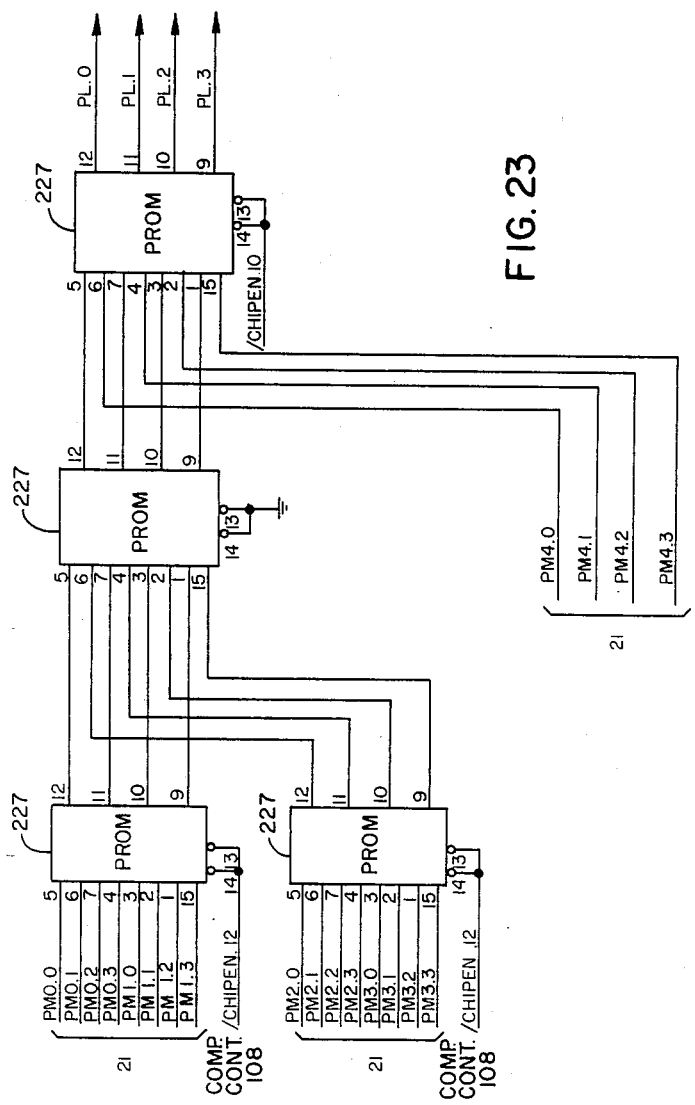
FIG. 23 is a series of programmable read-only memories which determine the lowest value print font of a series of five print fonts.

In particular, the print font data contained within the registers 220 are compared one with another by the comparator circuits 223 shown in FIG. 22 to determine whether all print fonts are equal to one another. The print fonts are also passed to programmable read-only memories (PROMs) 227 shown in FIG. 23 to determine the lowest value print font, which is in turn passed to the programmable read-only memories (PROMs) 222 shown in FIG. 21. The PROMs 222 receive the low order print font and the five print fonts stored in the registers 220 to generate a signal for each print font indicating whether it is equal to the lower order print font or equal to the low order print font plus one. This information is appropriately processed by the continuous tone state controller of FIGS. 19 and 20 to select the appropriate continuous tone output word via the data selectors 217 of FIG. 18.

One of the compression codes used by the continuous tone compressor is a pattern for which there is a series of identical print fonts. The maximum run length this code can handle is 16 and a counter 224 shown in FIG. 17 is used to indicate when the maximum count has been achieved. A continuous run-length maximum (CRLM) signal generated by the counter 224 is the status bit passed to the continuous tone state controller of FIGS. 19 and 20 to indicate that the maximum run length has been achieved. The counter 224 is initially loaded with a count of 04 hex when it has been determined that there are five print fonts in the registers 220 which are equal in value. If the next print font generated is the same value as the others, the counter is incremented by one. The incrementation of the counter continues until CRLM is set or the next value loaded is not equal to the previous value.

The compression controller 108 of FIG. 10 includes control circuitry such as a microprocessor (not shown) which oversees the general operation of data compression, including the loading of the input buffers 100 and 102, from one or more appropriate data source. The compression controller 108 also inserts the synchronization words shown in FIG. 9 into the output buffer 110 at appropriate points during code generation which are determined by monitoring the next and continuous tone compressors 104 and 106. The synchronization codes as shown in FIG. 9 are inserted to: prefix and identify a normal compressed strip; prefix, suffix and identify a non-compressed strip; identify changes between text and continuous tone data; and, identify all white and all black data strips.

For the determination of whether an incoming data strip is all white or all black, an all white flip-flop circuit (not shown) and an all black flip-flop circuit (no shown) are included in the input buffers 100 and 102. The all white and all black flip-flop circuits are initially set prior to inputting data corresponding to a scanned strip. If a pel of block data is encountered, the all white flip-flop is reset to indicate that the strip is not all white. Similarly, if a pel of which data is encountered, the all black flip-flop is reset to indicate that the strip is not all black. The compression controller 108 reads the all white and all black flip-flops after one of the input buffers has been loaded, and in the event the all white or all black flip-flop is still set, an appropriate synchronization code word indicating an all white or all black strip is generated and the data is not applied to the compressors.

The compressor controller 108 also reviews the contents of the output buffer 110 after a data strip has been encoded to determine whether or not the raw data for a given data strip was actually compressed by operation of the text and/or continuous tone compressors. In the event that the coded data contained in the output buffer 110 after the compression of a data strip exceeds the uncoded data contained in the corresponding input buffer, uncoded or uncompressed data is written over the compressed data contained within the output buffer 110 to minimize the amount of data stored for a given data strip.

Figure 24:
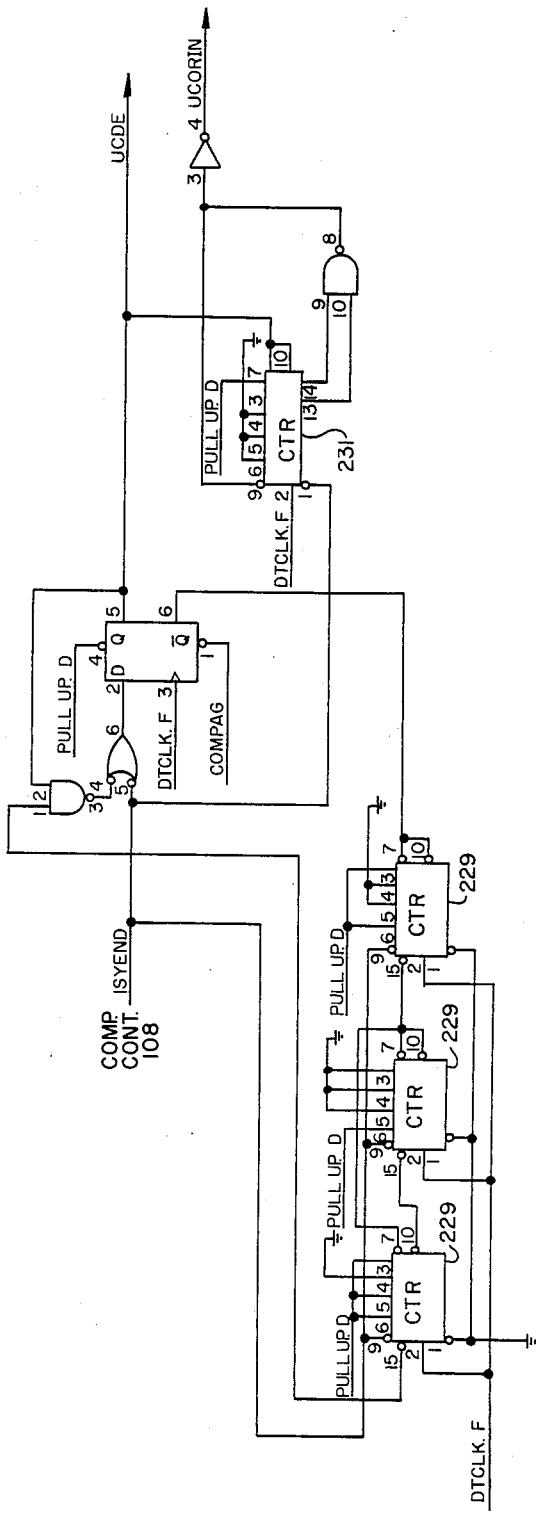
FIGS. 24 and 25 form a schematic diagram of the uncompressed data control 112 of FIG. 10.
Figure 25:
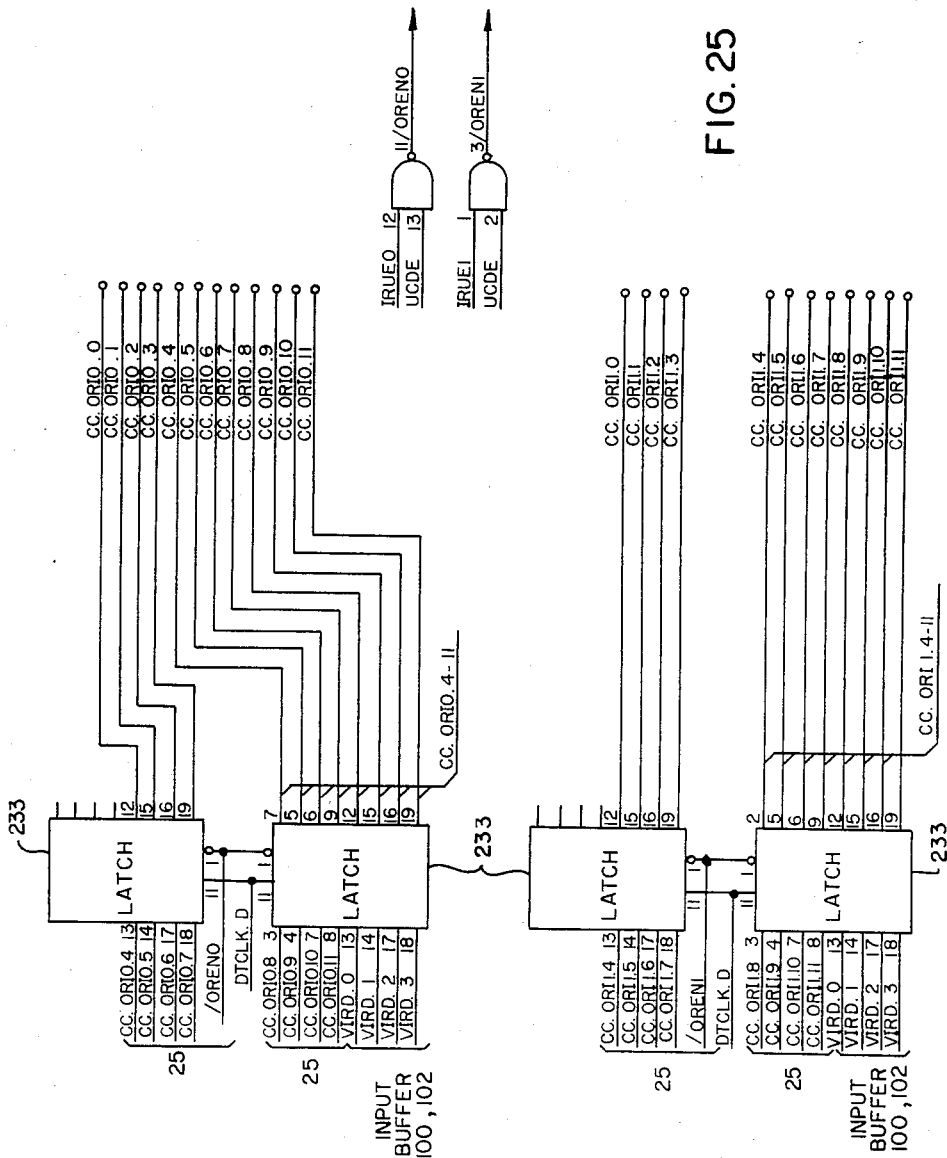

FIGS. 24 and 25 show the uncompressed data control 112 of FIG. 10 which is activated if uncompressed data is to be overwritten into the output buffer 110. Since the data contained within the corresponding input buffer of the input buffers 100 and 102 is in 5 bit data format, the circuitry of FIGS. 24 and 25 receives the 4 bits corresponding to the vertical data patterns and reformats them into 12 bit data words for storage in the output buffer 110.

Figure 26:
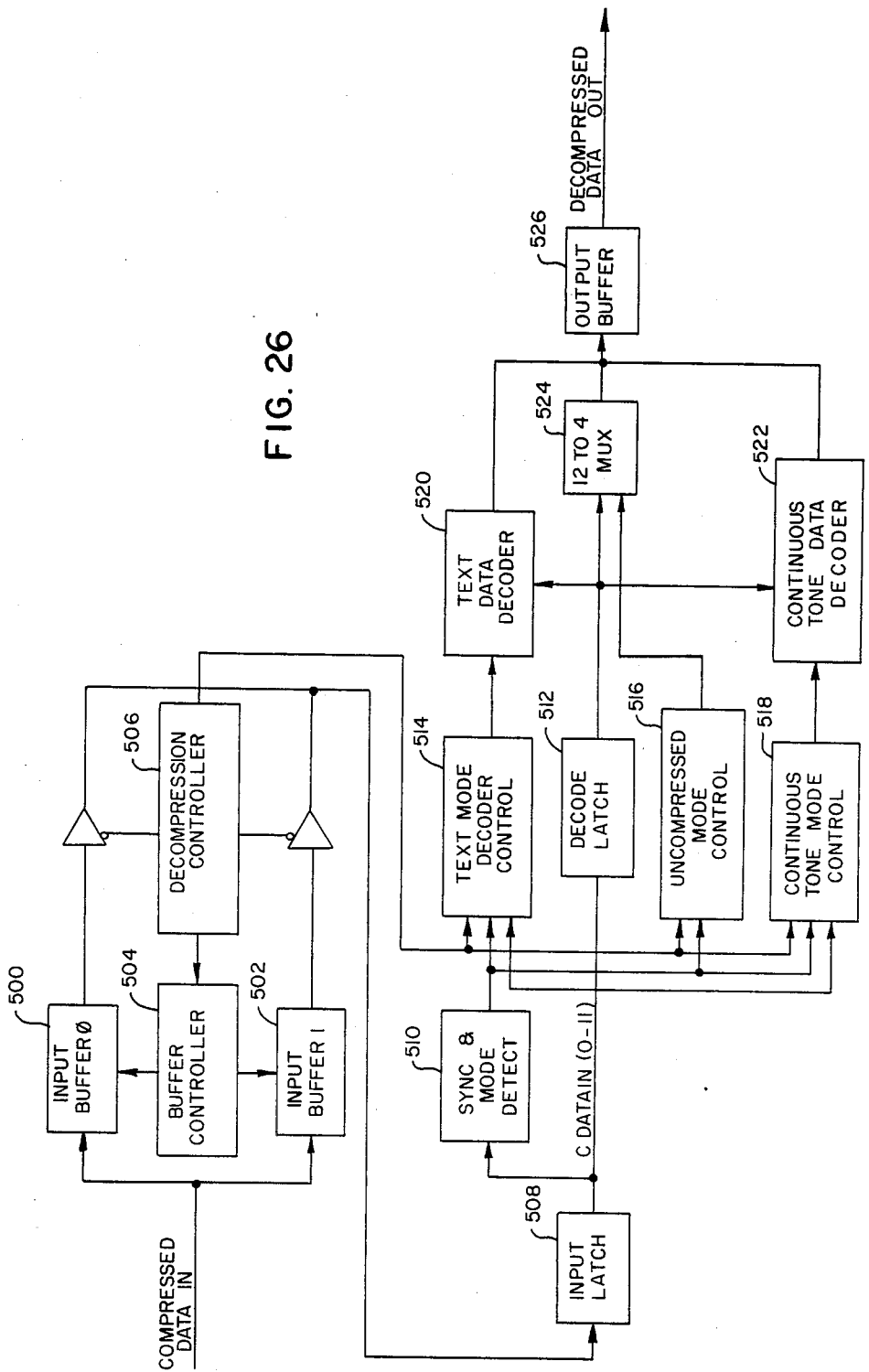
FIG. 26 is a block diagram of a data decompression system in accordance with the present invention.

FIG. 26 is a block diagram of an illustrative embodiment of a data decompression system in accordance with the present invention. Compressed image data is input to data compression input buffers 500 and 502. An input buffer controller 504 under the control of a decompression controller 506 treats the input buffers 500 and 502 as independent buffers which it "ping-pongs", i.e., writes to one while the other is being read. In this way, the input buffer controller 504 essentially can transfer compressed data to the input latch 508 at all times.

The decompression system handles three types of data contained within a compressed data block, i.e, compressed text data, compressed continuous tone data and uncompressed data. Corresponding to these three data types, the decompression system operates in three data modes: the text data mode, the continuous tone data mode and the uncompressed data mode.

Twelve bits of compressed data is initially loaded into the input latch 508 at which point the data is reviewed by a synchronization and mode detect circuit 510 to determine the data mode and format, and to determine if a synchronization code has occurred. The compressed input data is latched a second time into a decode latch 512 where it is held for the actual data decompression. Dependent upon the data mode detected, a text mode decoder control 514, an uncompressed mode control 516 or a continuous tone mode control 518 is enabled.

Text data is decoded by a text data decoder 520, continuous tone data is decoded by a continuous tone data decoder 522 and uncompressed data is unpacked by a 12 to 4 multiplexer 524. The output signals of the text data decoder 520, the continuous tone data decoder 522 and the 12 to 4 multiplexer 524 are passed to an output buffer 526. The output buffer 526 accumulates decompressed data which can then be used to duplicate the originally scanned document from which the image data was produced.

Figure 27:
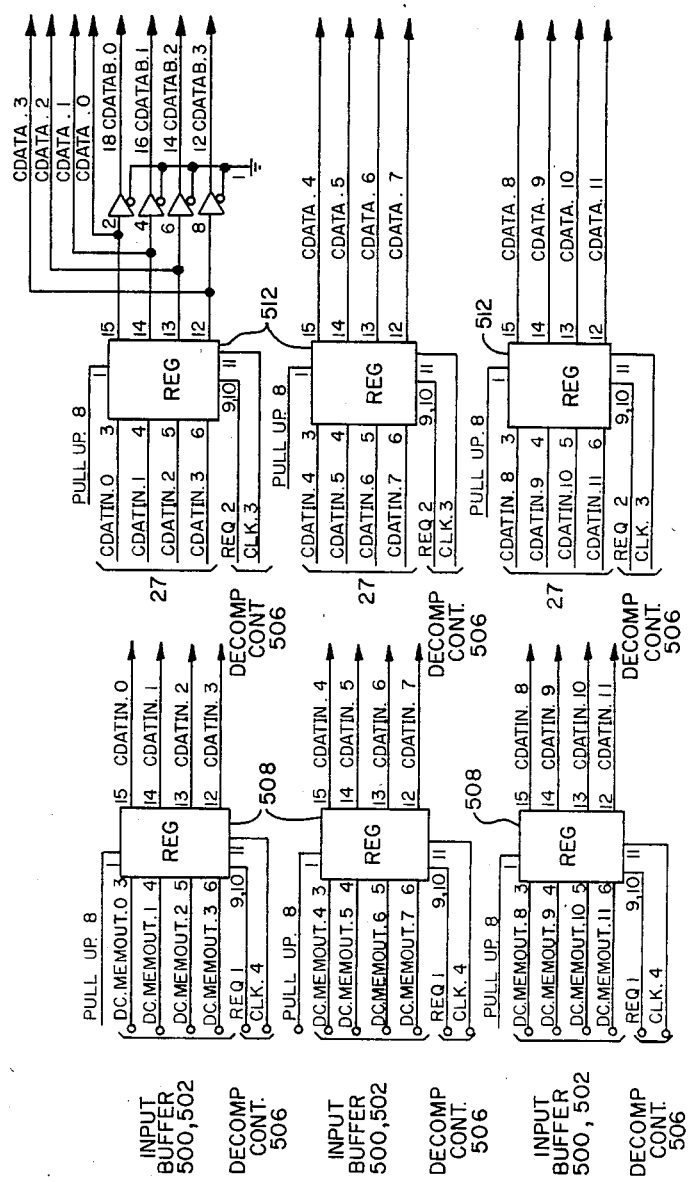
FIG. 27 shows input and decode latches of FIG. 26.
Figure 28:
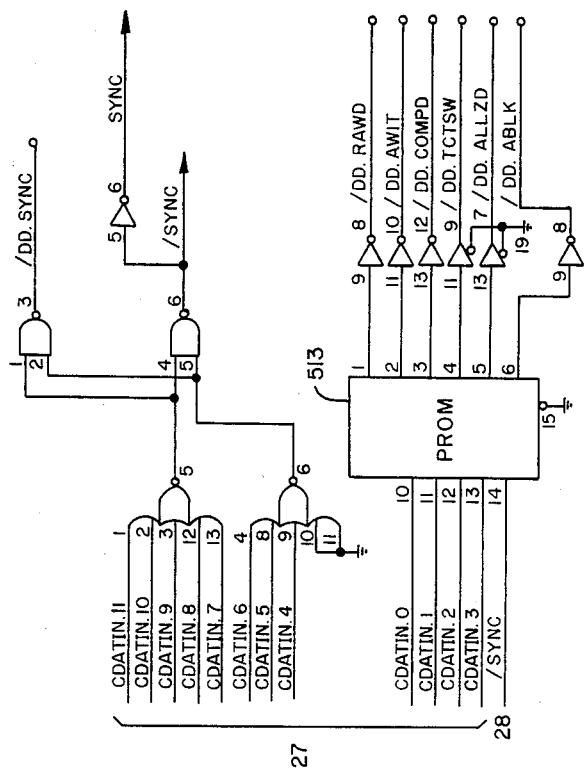
FIG. 28 shows synchronization code word and mode detect circuitry of FIG. 26.

The input latch 508 and decode latch 512 are shown in FIG. 27. Since every coded data strip is preceded by a synchronization code word, the synchronization code is used by the decoder to verify that the input data corresponds to the start of a strip or to a valid mode change. A synchronization code is detected if the 8 most significant bits of the 12 bit data word are zeros as shown in FIG. 28. The 4 least significant bits of a synchronization code are decoded to determine the mode and special cases such as all white data, all black data or a text/continuous tone mode change, see FIG. 9 and previous description relative to synchronization code words.

It is noted that at least one synchronization code word is present at the end of each block of coded data since a synchronization code word must be detected before decompression commences. In the event the last data strip is not an uncompressed strip which naurally ends with a synchronization code word, one or more all zero synchronization code words are added to the end of each coded block by the compression controller 108. The suffixing of at least one synchronization code word to each coded block permits bidirectional decoding since the suffixing synchronization code word identifies data to be decoded or signals valid compressed data and a default to text data is made.

Figure 29:
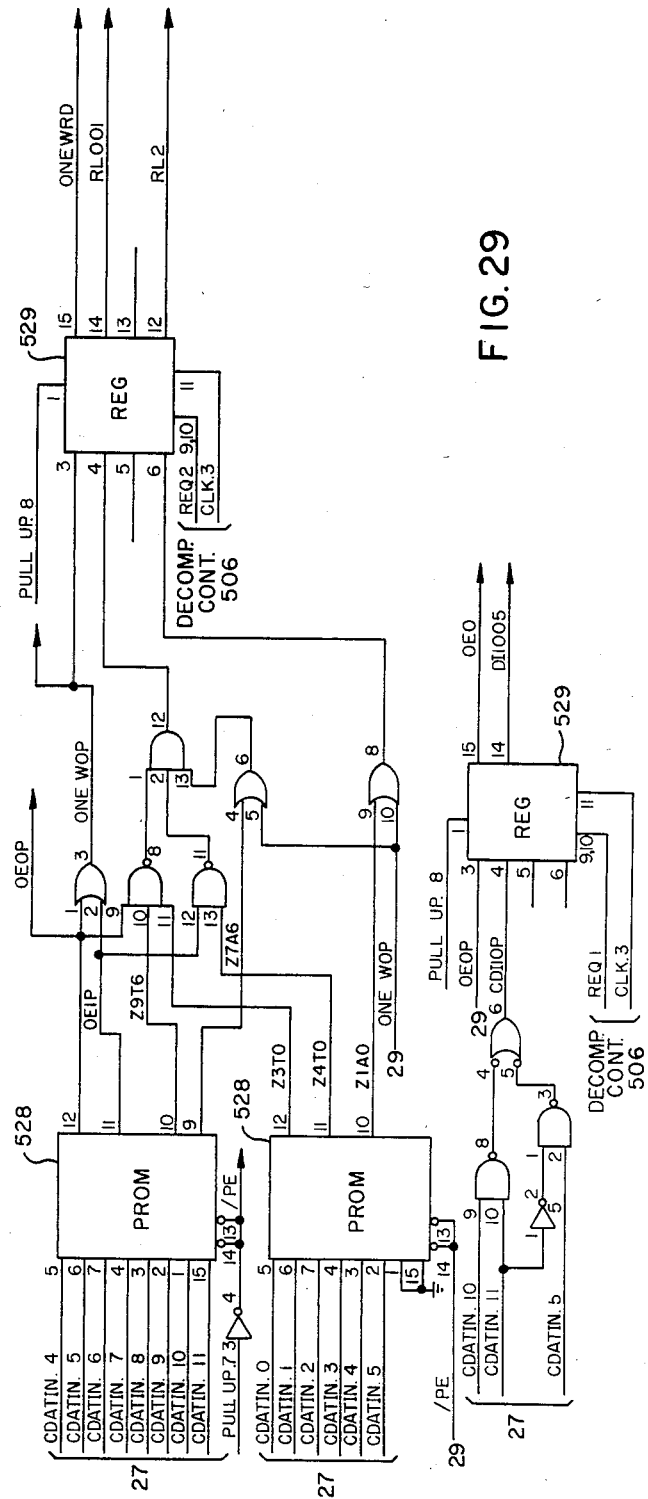
FIG. 29 is a schematic diagram of a portion of the text mode decoder control of FIG. 26.

A portion of the text mode decoder control 514 is shown in FIG. 29. The circuitry in FIG. 29 receives from the input latch 508 the particular data bits which correspond to the text control fields of the compressed coded word contained within the input latch 508. These text control field data bits are applied to two programmable read-only memories (PROMs) 528 which are programmed to generate the format of the word contained within the input latch 508. This format information is then latched at the same time that the compressed coded word is passed to the decode latch 512. Once the coded word is within the decode latch 512, it is accessible to the circuitry for determining the corresponding vertical data pattern and the run length as well as the circuitry for controlling the output buffer 526 to store the appropriate number of vertical data patterns therein.

Figure 30:
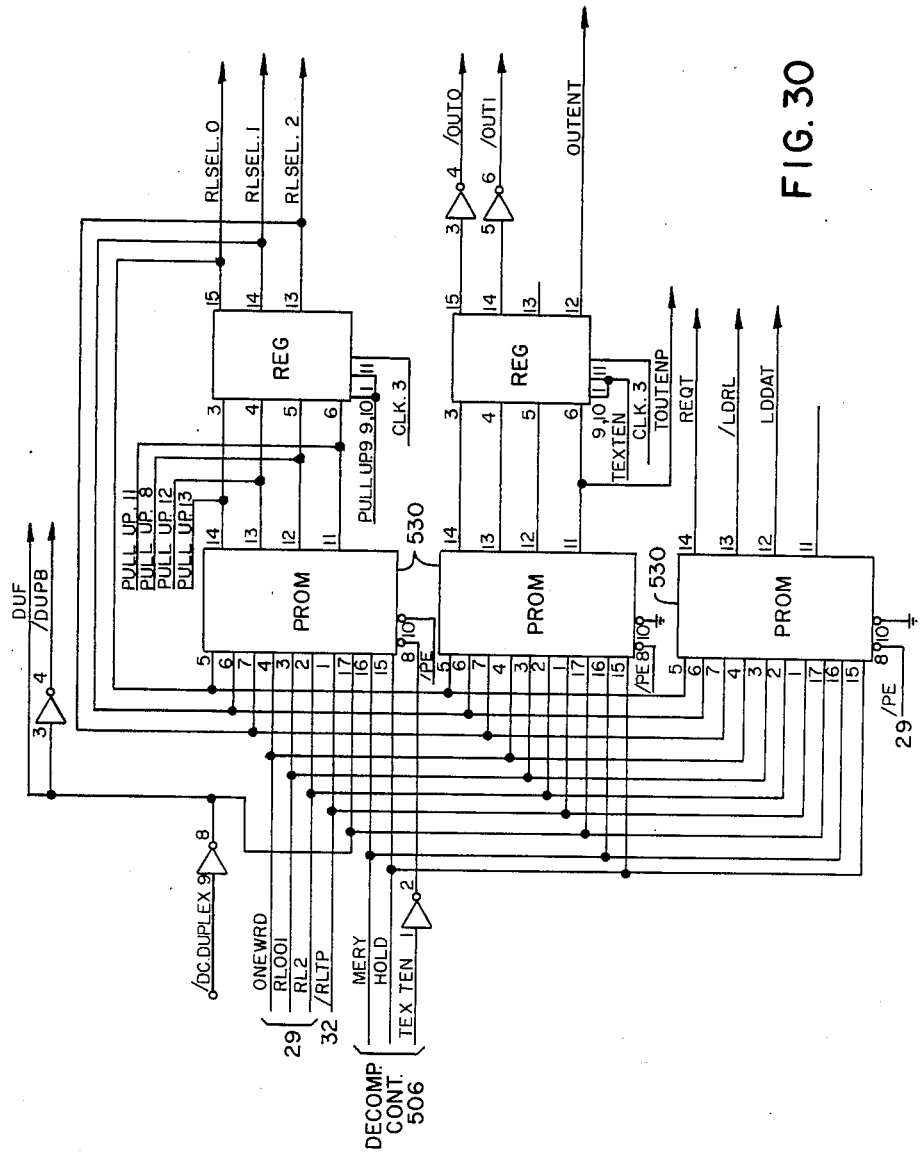
FIG. 30 shows the circuitry for generating the output buffer control signals and the run-length select signals for data decompression.
Figure 31:
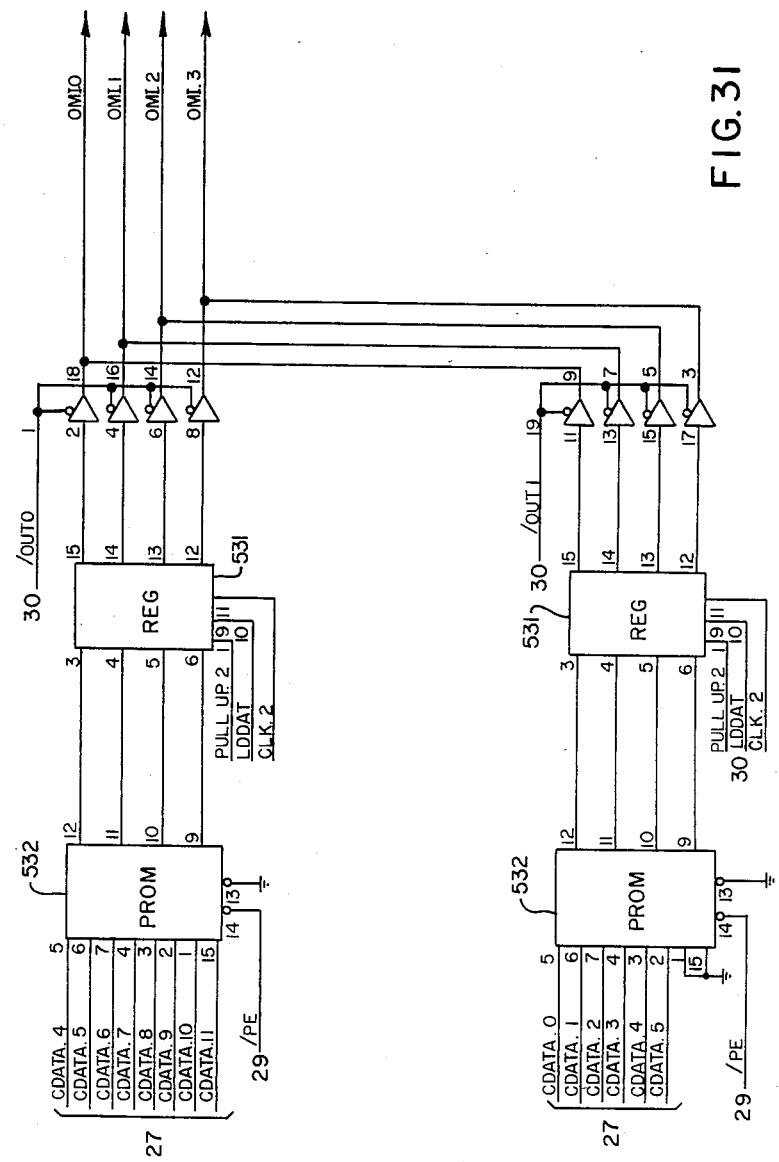
FIG. 31 shows the compressed text data decoder circuitry of FIG. 26.

FIG. 30 comprises three programmable read-only memories (PROMs) 530 which are programmed to generate output buffer control signals and run-length select signals. The compressed coded word is decompressed by two programmable read-only memories (PROMs) 532 shown in FIG. 31 which are addressed by the data contained within the decode latch 512 to select the proper output data pattern.

Figure 32:
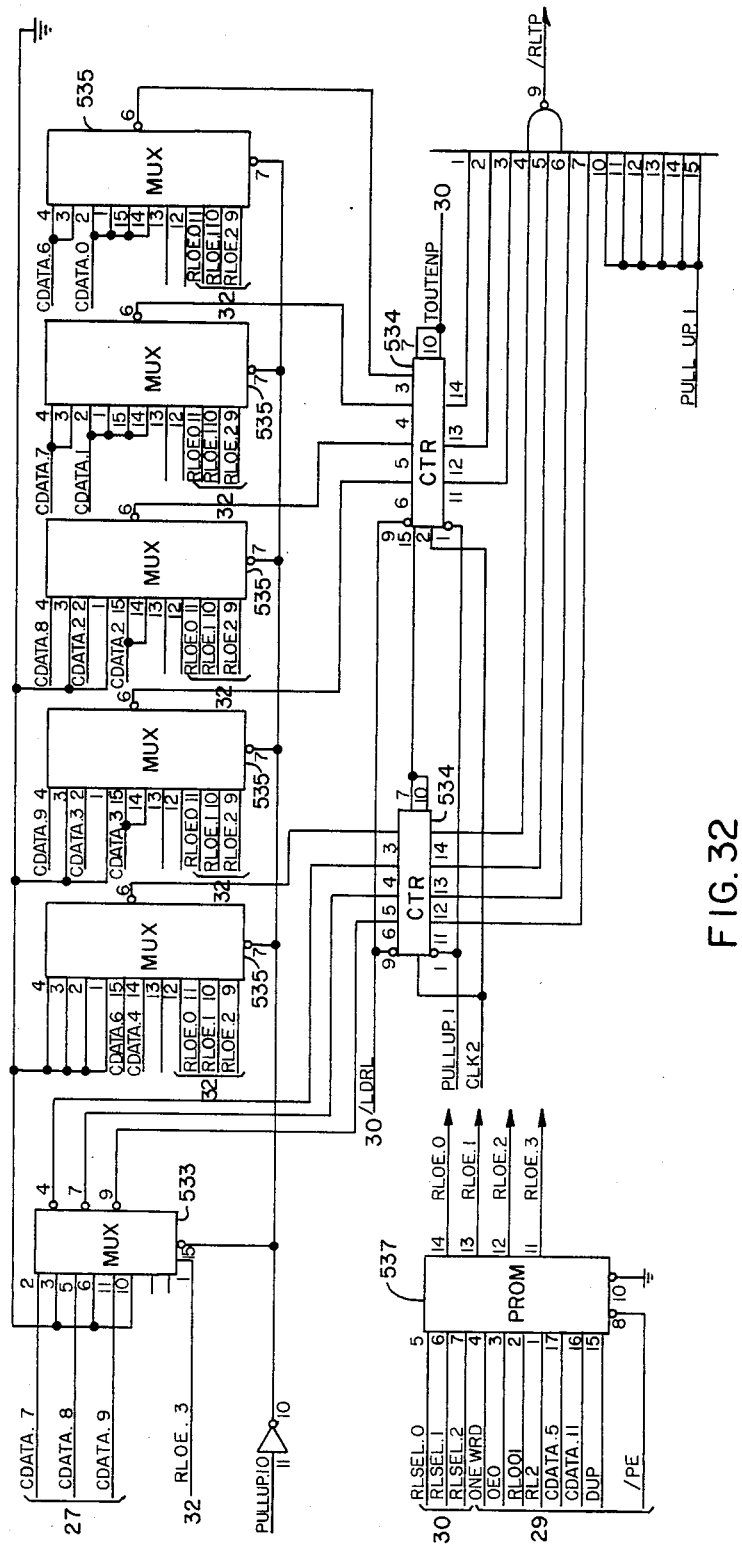
FIG. 32 shows run-length counters which determine the number of times a text pattern is loaded into the output buffer.

FIG. 32 shows the run-length counters 534 which are used to determine the number of consecutive times that a text pattern is to be loaded into the output buffer 526. The counters 534 are loaded with the complement of the data from the run-length field of the current compressed coded word contained within the decode latch 512 which data represents the number of times that the given text pattern is to be repeated. The counters 534 are loaded via multiplexers 533,535, the output signals of which are controlled via programmable read-only memory (PROM) 537.

Figure 33:
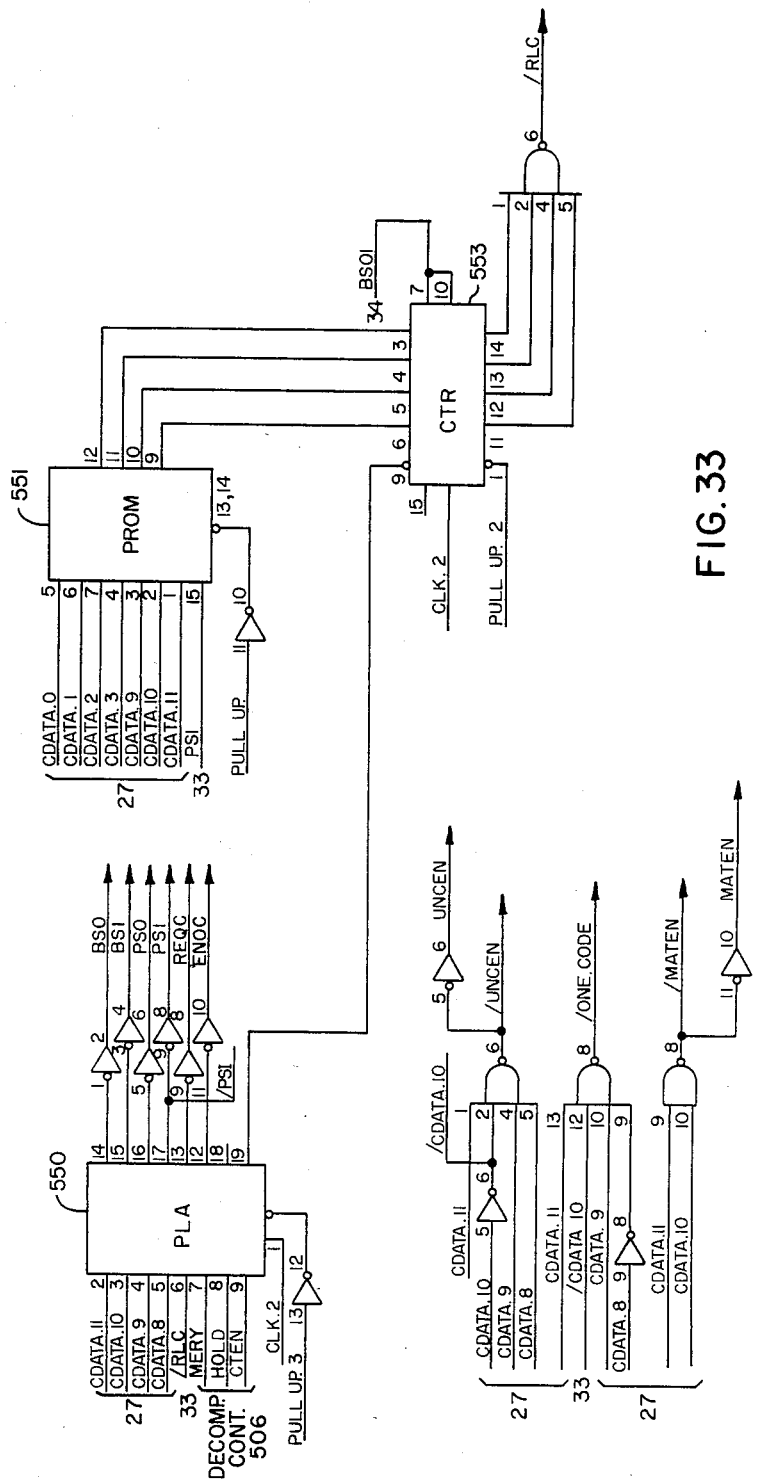
FIGS. 33 through 36 are a schematic diagram of a continuous tone data decompressor in accordance with the present invention.
Figure 34:
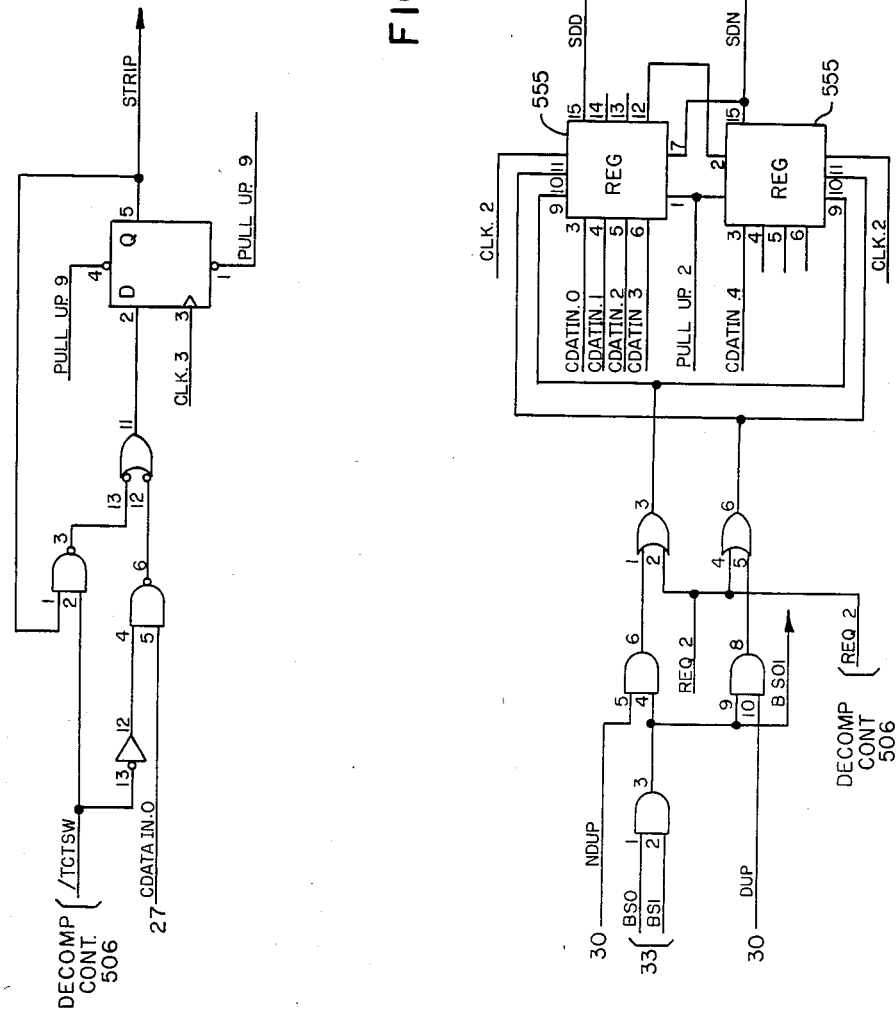
Figure 35:
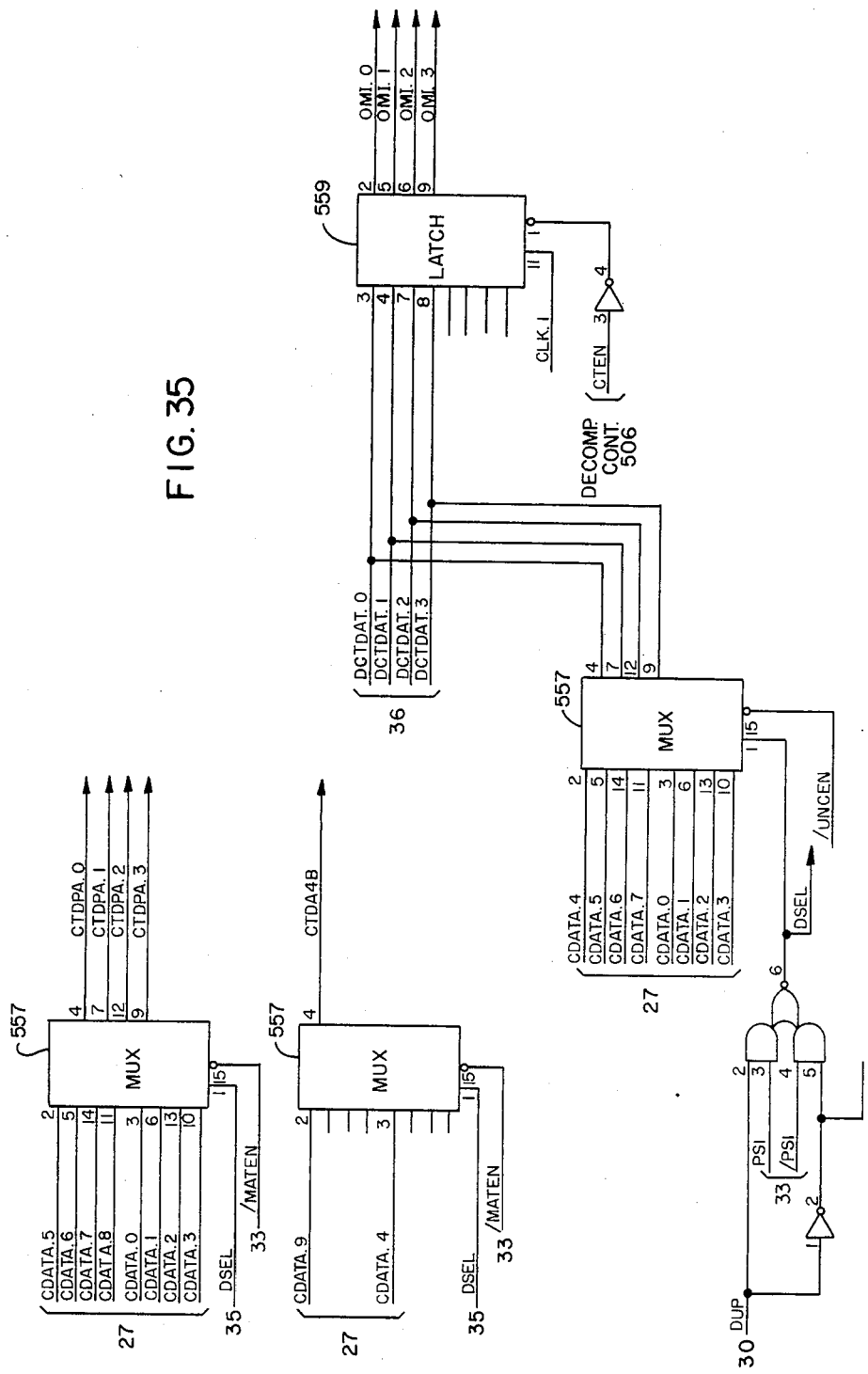
Figure 36:
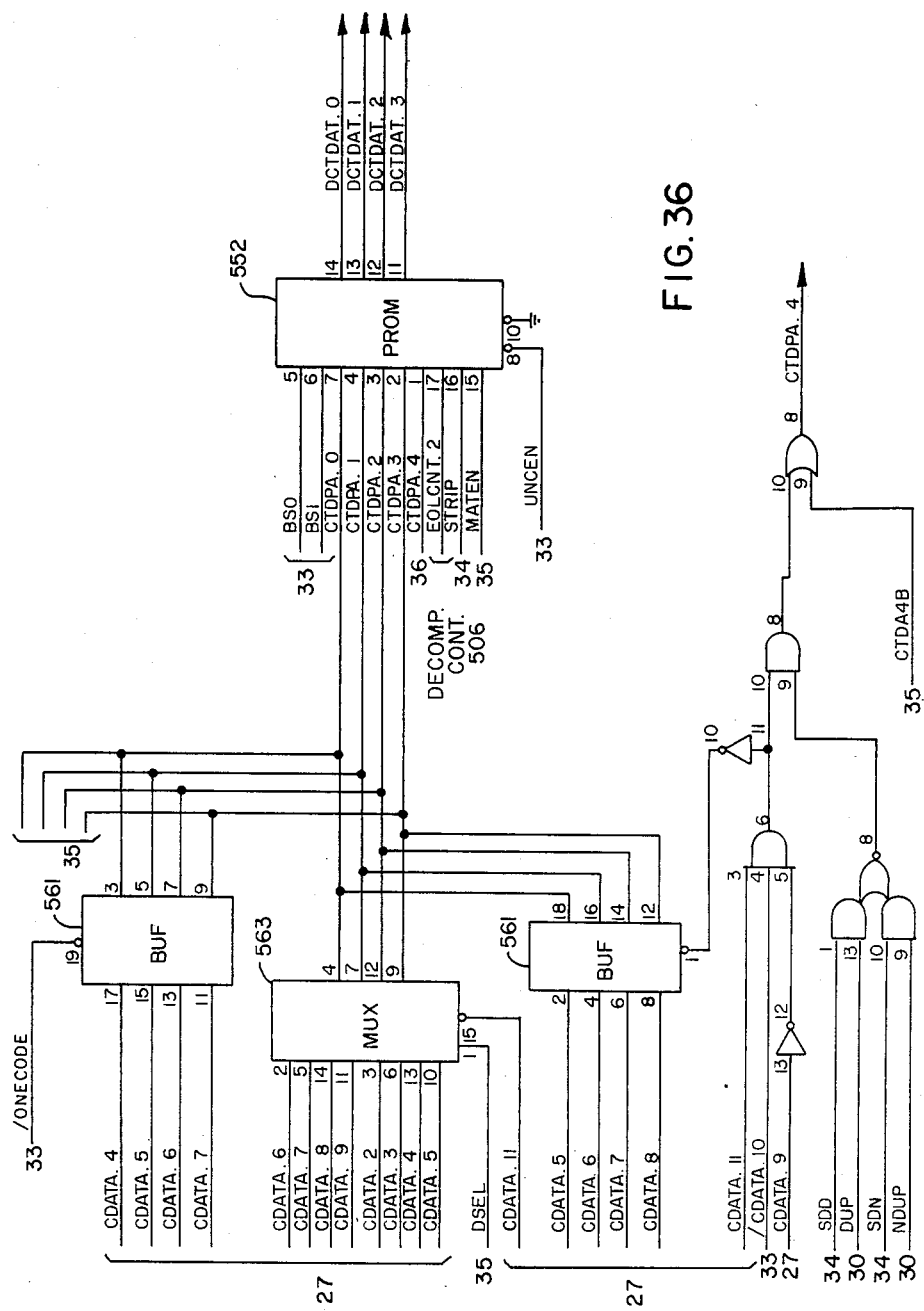

FIGS. 33 through 36 show the continuous tone mode decompression. FIG. 33 shows continous tone control circuitry and run-length counter 553 for the decompression of continuous tone data. A programmable logic array (PLA) 550 provides the control for continuous tone decompression. FIG. 34 shows the continuous tone base selector for continuous tone print fonts that are encoded into the base/designator format as described with reference to FIG. 8. FIG. 35 provides for selection of the proper data bits for detected match fonts and uncompressed data. FIG. 36 includes a programmable read-only memory (PROM) 552 which performs the actual generation of the 4 bit data patterns to define the decoded print font, match font or uncompressed vertical data patterns included within compressed continuous tone.

Figure 37:
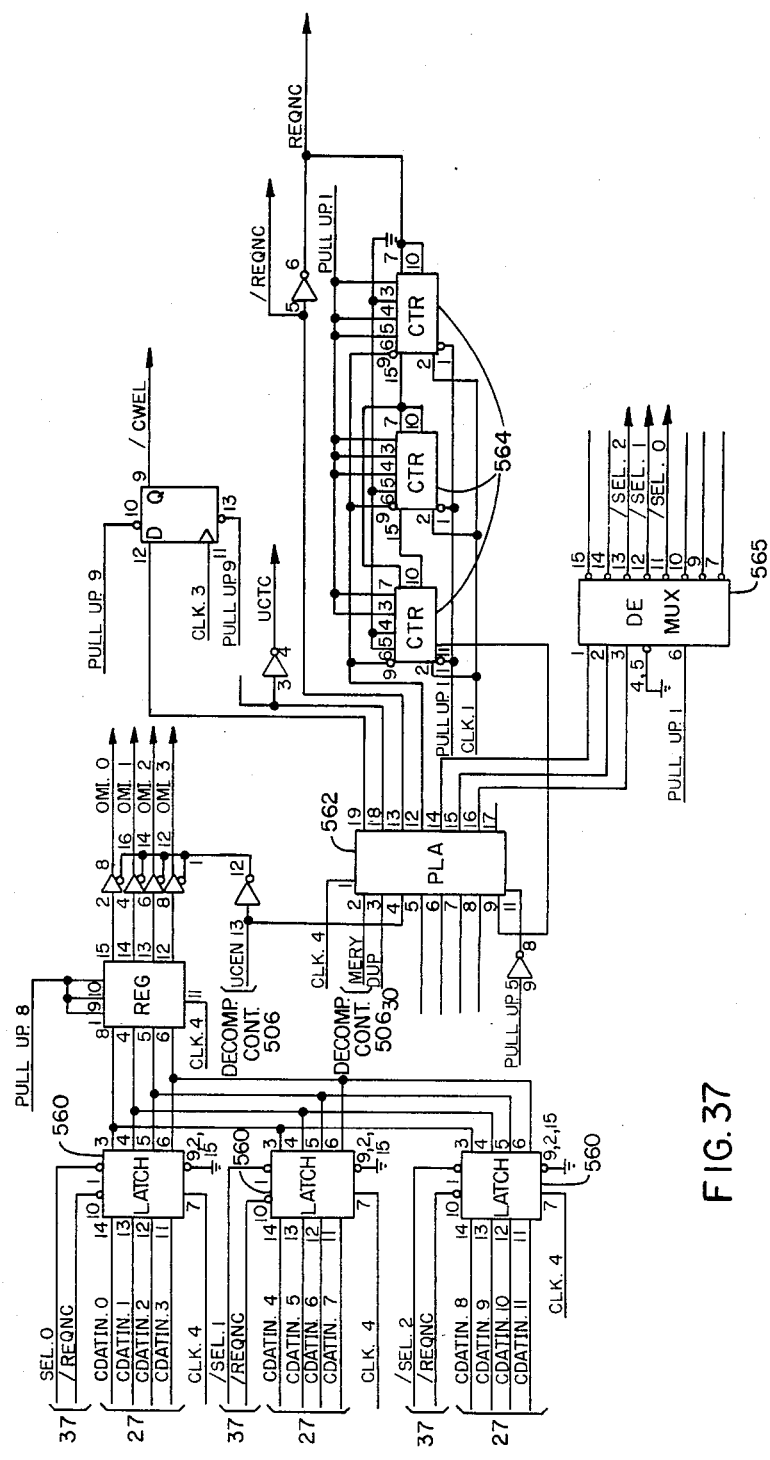
FIG. 37 shows the circuitry for unpacking uncompressed data.

As previously described, a strip of data which is included in a compressed block as uncompressed data is packed into 12 bit data words to be compatible with the compressed data. However, for the uncompressed data, the values are not encoded, but merely packed three abreast, i.e., three 4 bit uncoded vertical data patterns are packed into each 12 bit word. As shown in FIG. 37, three 4 bit latches 560 are used to unpack the uncompressed data. The latches are enabled sequentially to effect a 12 bit to 4 bit multiplexing of the data, i.e., three parallel words to three series words where each word comprises 4 bits, thus unpacking the data. The output buffer 526 shown in FIG. 26 is controlled by controller circuitry (not shown) while control of the run-length counters 564 shown in FIG. 37 is performed by a programmable logic array 562. The run-length counters 564 are incremented every time an unpacked data word is outputted to the output buffer 526.

One successful embodiment of the disclosed compression/decompression system has been constructed using the following major components.

TABLE I

| | |
|---|---|
| 105,101,109,121,508 | Register, SN74S194, available from Texas Instruments |
| 512,529,531,555,567 | |
| 107,513 | Programmable Read-Only Memory (PROM), 82S123, available from Signetics |
| 111,223 | Comparator, SN74S85, available |

TABLE I-continued

| | |
|---|---|
| 103,203 | from Texas Instruments<br>Multiplexer, SN74S157, available from Texas Instruments |
| 120,206,208,212,214,<br>530,537,552 | Programmable Read-Only Memory (PROM), 93453, available from Fairchild |
| 131,136 | Hex Flip-Flop Circuit, SN74S174, available from Texas Instruments |
| 151,229 | Counter, SN74LS669, available from Texas Instruments |
| 153,209,224,231,<br>534,553,564 | Counter, SN74S163, available from Texas Instruments |
| 155,161,561 | Buffer and Line Driver, SN74S244, available from Texas Instruments |
| 157,205,217,535 | Multiplexer, SN74S251, available from Texas Instruments |
| 159,200,201,202,<br>204,220 | Octal Flip-Flop Circuit, SN74LS377, available from Texas Instruments |
| 207,227,528,532,551 | Programmable Read-Only Memory (PROM), 82S129, available from Signetics |
| 209,565 | Demultiplexer, SN74S138, available from Texas Instruments |
| 211,560 | Register, SN74S173, available from Texas Instruments |
| 218,550,562 | Programmable Logic, PAL16R4, available from Monolithic Memories |
| 222 | Programmable Read-Only Memory (PROM), 82S126, available from Signetics |
| 225 | Multiplexer, SN74S151, available from Texas Instruments |
| 233,559 | Octal Latch, SN74S374, available from Texas Instruments |
| 533 | Multiplexer, SN74S528, available from Texas Instruments |
| 557,563 | Multiplexer, SN74S257, available from Texas Instruments |

It is apparent from the above description that an improved compression/decompression method and apparatus have been disclosed for use, for example, in a duplicating system wherein image data representative of a document is compressed, stored, decompressed in either direction and then utilized to duplicate the document.

While the method herein described and the form of apparatus for carrying this method into effect constitute preferred embodiments of this invention, it is to be understood that the invention is not limited to this precise method and form of apparatus and that changes may be made in either without departing from the scope of the invention which is defined in the appended claims.

What is claimed is:

1. A method of encoding digital data representative of a document to be duplicated and obtained by scanning said document, said digital data including both text data and continuous tone data and said method comprising the steps of:
    assembling said digital data into scanned strips of said document with each scanned strip comprising a plurality of scan lines of said document;
    reading the scan lines in parallel to form data words defining columns of said scanned strips;
    counting the number of consecutive data words in each scanned strip which are identical to one another to determine the run lengths of said identical data words;
    encoding each run of data words read and the corresponding run length into a fixed length coded word, said continuous tone data being encoded such that at least some of said data words define blocks of said scanned strips each block comprising at least two individual columns of a scanned strip;
    concatenating all fixed length coded words to represent said document;
    prefixing a synchronization word to each encoded scanned strip; and
    inserting additional synchronization words at any transition of data words from text to continuous tone or from continuous tone to text.

2. A method of encoding digital data as claimed in claim 1 wherein at least the first and last data words of each scanned strip are defined as text data and the prefixing synchronization word includes the identification of the strip as beginning with text data.

3. A method of encoding digital data as claimed in claim 1 further comprising the steps of:
    determining whether each scanned strip is all white or all black prior to encoding the strip; and
    inserting a synchronization word to identify each all white or all black strip whereby coding of such strips is unnecessary.

4. A method of encoding digital data as claimed in claim 1 further comprising the steps of:
    reviewing the coded words generated to represent each scanned strip; and
    substituting uncoded scanned strip data for generated coded words in the event that the generated coded words exceed the uncoded scanned strip data.

5. A method of encoding digital data as claimed in claim 4 wherein the prefixing synchronization word identifies the data strip as uncompressed data and a similar synchronization word suffixes each uncompressed data strip.

6. A method of encoding digital data representative of a document to be duplicated and obtained by scanning said document, said data representing either text data or continuous tone data and said method resulting in compressed data which can be decompressed in either direction to recover the original digital data and comprising the steps of:
    assembling said digital data into scanned strips of said document with each scanned strip comprising a plurality of scan lines of said document;
    reading the scan lines of said scanned strips in parallel to form data words defining columns of said scanned strips;
    defining at least the first and last data words of each scanned strip as text data;
    counting the number of consecutive data words in each scanned strip which are identical to one another to determine the run lengths of said identical data words;
    encoding each run of data words read and the corresponding run length into fixed length coded words;
    concatenating all fixed length code words for each scanned strip to form coded scanned strips;
    reviewing each coded scanned strip;
    substituting uncoded scanned strip data for any coded scanned strip which exceeds its corresponding uncoded scanned strip data;
    concatenating all coded and uncoded scanned strips to form a coded representation of said document;

inserting synchronization words before each coded scanned strip and before and after each uncoded scanned strip; and inserting synchronization words into said coded scanned strips to separate text data from continuous tone data and continuous tone data.

7. A method of handling digital data representative of a document to be duplicated and obtained by scanning said document comprising the steps of:

assembling said digital data into scanned strips of said document with each scanned strip comprising a plurality of scanned lines of said document;

reading the scanned lines in parallel to form data words defining columns of said scanned strips;

counting the number of consecutive data words in each scanned strip which are identical to one another to determine the run length of said identical words;

encoding each run of data words read and the corresponding run length into a fixed-length coded word;

storing all fixed-length coded words in a concatenated form to represent said document;

reading said concatenated fixed-length coded words; and decoding said fixed-length coded words to obtain the digital data representative of the document to be duplicated.

8. A method of handling digital data as claimed in claim 7 wherein said digital data includes both text data and continuous tone data, said continuous tone data being encoded such that at least some of said data words define blocks of said scanned strips, each block comprising at least two individual columns of a scanned strip, and further comprising the steps of:

defining at least the first and last data words of each scanned strip as being text data;

prefixing a synchronization word to each encoded scanned strip, said synchronization word including the identification of the strip as beginning with text data; and inserting synchronization words between data words representing text and data words representing continuous tone, said reading step being either from the first encoded data word to the last or from the last encoded data word to the first whereby the encoded data can be decoded in either direction to recover the original digital data.

9. A method of handling digital data as claimed in claim 8 further comprising the steps of:

reviewing the coded words generated to represent each scanned strip;

substituting uncoded scanned strip data for generated coded words in the event that the generated coded words exceed the uncoded scanned strip data;

changing the prefixing synchronization word to identify the data strip as uncompressed data; and suffixing a synchronization word to each uncompressed data strip to identify the strip as uncompressed data.

10. Apparatus for encoding digital data representative of a document to be duplicated and obtained by scanning said document, said apparatus comprising:

buffer means for assembling said digital data into scanned strips of said document with each scanned strip comprising a plurality of scanned lines of said document;

pattern recognition means connected to said buffer means for identifying data words representative of columns of said scanned strips;

counter means responsive to said pattern recognition means for determining the run length of consecutive data words in each scanned strip which are identical to one another;

encoder means responsive to the identified data words and run lengths for forming fixed-length coded words representative thereof; and output buffer means for concatenating all fixed-length coded words to form a coded representation of said document.

11. Apparatus for encoding digital data as claimed in claim 10 wherein said pattern recognition means comprises:

text pattern recognition means for identifying data words representative of single columns of said scanned strips; and continuous tone pattern recognition means for identifying data words representative of at least two columns of said scanned strips.

12. Apparatus for encoding digital data as claimed in claim 11 further comprising control means for inserting synchronization code words into said coded representation of said document to identify the beginning of each coded scanned strip and to separate data representative of text from data representative of continuous tone.

13. Apparatus for encoding digital data as claimed in claim 12 wherein said control means further provides for reviewing each coded scanned strip data and for substantially uncoded scanned strip data for coded scanned strip data if the uncoded scanned strip data is less, said control means also inserting synchronization code words at the beginning and end of each strip of uncoded data to identify such strips as uncoded.

14. A method of encoding digital data representative of a document to be duplicated and obtained by scanning said document comprising the steps of:

assembling said digital data into scanned strips of said document with each scanned strip comprising a plurality of scan lines of said document;

reading the scan lines in parallel to form data words defining columns of said scanned strips;

counting the number of consecutive data words in each scanned strip which are identical to one another to determine the run lengths of said identical data words;

encoding runs of data words read and the corresponding run lengths into fixed length coded words, said run lengths being equal to or less than one of a number of maximum run lengths associated with said fixed length coded words; and concatenating all fixed length coded words to represent said document.

15. A method of encoding digital data as claimed in claim 14 further comprising the step of prefixing a synchronization word to each encoded scanned strip.

16. A method of encoding digital data as claimed in claim 15 wherein said digital data includes both text data and continuous tone data, said continuous tone data being encoded such that at least some of said data words define blocks of said scanned strips each block comprising at least two individual columns of a scanned strip and further comprising the step of inserting additional synchronization words at any transition of data words from text to continuous tone or from continuous tone to text.

* * * * *

UNITED STATES PATENT AND TRADEMARK OFFICE
CERTIFICATE OF CORRECTION

PATENT NO. : 4,568,983
DATED : February 4, 1986
INVENTOR(S) : Thomas W. Bobick

It is certified that error appears in the above—identified patent and that said Letters Patent is hereby corrected as shown below:

```
Column 1, line 59, "of from" should read --or from--.

Column 14, line 16, "next" should read --text--; and
          line 31, "which" should read --white--.

Column 15, line 49, "naurally" should read --naturally--.

Column 17, line 35, "SN74S528" should read --SN74S258--.

Column 20, line 32, "substantially" should read
                    --substituting--.
```

Signed and Sealed this

Twenty-seventh Day of May 1986

[SEAL]

Attest:

DONALD J. QUIGG

Attesting Officer

Commissioner of Patents and Trademarks